(12) United States Patent
Asami

(10) Patent No.: US 7,813,056 B2
(45) Date of Patent: Oct. 12, 2010

(54) IMAGING LENS AND CAMERA SYSTEM INCLUDING THE SAME LENS

(75) Inventor: Taro Asami, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/857,336

(22) Filed: Sep. 18, 2007

(65) Prior Publication Data

US 2008/0068729 A1 Mar. 20, 2008

(30) Foreign Application Priority Data

Sep. 19, 2006 (JP) ............................. 2006-252998
Sep. 6, 2007 (JP) ............................. 2007-231999

(51) Int. Cl.
G02B 27/10 (2006.01)
G02B 13/18 (2006.01)
G02B 3/02 (2006.01)

(52) U.S. Cl. ...................................... 359/753; 359/716

(58) Field of Classification Search ................. 359/716, 359/753, 784, 689, 790
See application file for complete search history.

(56) References Cited

U.S. PATENT DOCUMENTS

| | | | | |
|---|---|---|---|---|
| 2,240,157 | A * | 4/1941 | Gagnen et al. | ........... 351/160 R |
| 5,305,148 | A | 4/1994 | Ikemori et al. | |
| 2003/0058549 | A1 | 3/2003 | Hagimori | |
| 2004/0090685 | A1 * | 5/2004 | Chen | ........................... 359/784 |
| 2006/0171042 | A1 | 8/2006 | Hirose et al. | |
| 2006/0256416 | A1 * | 11/2006 | Zeng et al. | ................... 359/784 |

FOREIGN PATENT DOCUMENTS

| | | |
|---|---|---|
| EP | 1 777 569 A | 4/2007 |
| EP | 1 777 941 A1 | 4/2007 |
| JP | 6-34879 A | 2/1994 |
| JP | 10-170821 A | 6/1998 |
| JP | 3206930 B2 | 7/2001 |
| JP | 2001-337268 A | 12/2001 |
| JP | 2005-181596 A | 7/2005 |
| JP | 2005-321742 A | 11/2005 |
| JP | 2006-168683 A | 6/2006 |
| JP | 2006-209028 A | 8/2006 |

* cited by examiner

*Primary Examiner*—Alicia M Harrington
(74) *Attorney, Agent, or Firm*—Birch, Stewart, Kolasch & Birch, LLP

(57) ABSTRACT

An imaging lens comprises, in order from an object side: a first lens having a negative refractive power with a concave surface on an image side thereof; a second lens with at least one aspherical surface; an aperture stop; and a third lens having a positive refractive power with at least one aspherical surface, wherein the first lens is formed of an optical glass whose Abbe number is 40 or more, the second lens is formed of a plastic whose Abbe number is 40 or less, and the third lens is formed of a plastic whose Abbe number is 50 or more, and wherein assuming that a point, where a light ray which constitutes an outermost light ray in light rays which enter an image plane intersects a lens surface, constitutes an effective aperture terminating edge, the second lens is such that an intersection point between an object side surface and an optical axis lies closer to an image forming side of the imaging lens than an effective aperture terminating edge of the object side surface does.

18 Claims, 22 Drawing Sheets

IMAGING LENS AND CAMERA SYSTEM INCLUDING THE SAME LENS

BACKGROUND OF THE INVENTION

1. Field of the Invention

The present invention relates to an imaging lens for forming an optical image on a solid state image sensing device which is suitable for use for an onboard camera, a monitor camera, a mobile terminal camera and the like and a camera system which utilizes the imaging lens.

2. Description of the Related Art

Onboard cameras are known which pick up images of surroundings of a motor vehicle on which the cameras are installed to show the driver conditions surrounding the vehicle via images on a monitor screen (for example, refer to JP-A-2006-168683). These onboard cameras include, for example, an outside camera which is provided on an outside of the vehicle for assisting the driver to drive the vehicle by picking up images of surroundings which lie within a blind range to the driver and an inside camera which is designed to pick up images of conditions resulting when the vehicle is involved in a traffic accident in the same way as viewed by the driver. In recent years, in association with an increase in performance and a decrease in price of solid state image sensing devices, it is becoming a general trend to equip onboard cameras even on ordinary vehicles.

In the related art, imaging lenses like those described in, for example, Japanese Patent No. 3206930, JP-A-10-170821, JP-A-2001-337268 and JP-A-2005-321742 are known as small wide-angle lenses for use for onboard cameras, monitor cameras, mobile terminal cameras and the like. Imaging lenses described in Japanese Patent No. 3206930 and JP-A-10-170821 are such as to include, in order from an object side, a planoconcave lens and two positive lenses so as to allow a good telecentric characteristic to be compatible with compactness. In addition, imaging lenses described in JP-A-2001-337268 and JP-A-2005-321742 are such as to be made up of three lenses, of which a first lens lying nearest to objects is made up of an aspherical plastic lens.

With the imaging lens described in Japanese Patent No. 3206930, there is provided a drawback that the production costs are increased due to the use of a material having a high refractive index. With the imaging lens described in JP-A-10-170821, there is provided a drawback that the f number is f/3.4, which is dark. The imaging lenses described in JP-A-2001-337268 and JP-A-2005-321742 are both a wide-angle lens made up of three lenses, and the plastic lens is used as the first lens which lies nearest to objects. Therefore, there is provided a drawback when used as an outside onboard camera that the plastic lens provides poor weathering resistance and hence, the performance thereof is easy to be deteriorated.

SUMMARY OF THE INVENTION

The invention has been made in view of the problems inherent in the related art, and an object thereof is to provide an imaging lens which can maintain a good optical performance and which is small in size, light in weight and low in cost and a camera which includes the imaging lens.

With a view to attaining the object, according to the invention, there is provided an imaging lens comprising, in order from an object side: a first lens having a negative refractive power with a concave surface on an image side thereof; a second lens with at least one aspherical surface; an aperture stop; and a third lens having a positive refractive power with at least one aspherical surface, wherein the first lens is formed of an optical glass whose Abbe number is 40 or more, the second lens is formed of a plastic whose Abbe number is 40 or less, and the third lens is formed of a plastic whose Abbe number is 50 or more, and wherein assuming that a point, where a light ray which constitutes an outermost light ray in light rays which enter an image plane intersects a lens surface, constitutes an effective aperture terminating edge, the second lens is such that an intersection point between an object side surface and an optical axis lies closer to an image forming side of the imaging lens than an effective aperture terminating edge of the object side surface does.

In particular, in the event that the imaging lens is used under a severe environment such as one in which the lens is used on an onboard camera, as a material for the first lens, a material is preferably used which has superior resistance to acids and water, and specifically, on water resistance [RW(p)] and acid resistance [RA(p)] standards provided by GLASS MANUFACTURERS' ASSOCIATION OF JAPAN, a material is preferable which has a resistance to acids classified as first to fourth grades and a resistance to water classified as first to third grades both based on the powder method. A material is further preferable which has a resistance to acids and a resistance to water both classified as the third grade or higher based on the powder method.

In addition, the second lens is such that an intersection point between an image side surface and the optical axis thereof lies closer to the image forming side of the imaging lens than an effective aperture terminating edge of the relevant surface does.

Additionally, the second lens is a meniscus lens having a concave surface on an object side thereof.

In addition, letting a distance from an apex on an object side surface of the first lens to the image plane be L and a focal length of the first lens be f1, the following conditional expression is satisfied:

$$0.5 < |L/f1| < 7 \qquad (1)$$

When an upper limit of the conditional expression (1) is surpassed, the overall length of the lens becomes long, and the miniaturization of the lens cannot be attained. On the contrary, when a lower limit is surpassed, the power of the first lens gets weak, and it becomes difficult to pick up images at wide angles. In addition, in order to reduce the overall length of the lens further, the following conditional expression is preferably satisfied:

$$0.5 < |L/f1| < 4$$

In addition, letting focal lengths of the second lens and the third lens be f2, f3, respectively, the following conditional expression is satisfied:

$$0.2 < |f2/f3| < 10 \qquad (2)$$

When an upper limit of the conditional expression (2) is surpassed, the field curvature is increased, and a good image cannot be obtained. On the contrary, when a lower limit is surpassed, the back focus becomes shorter, and the position of the entrance pupil gets nearer to the image plane, whereby the telecentric characteristic is reduced, which increases the incident angle of a light ray in a diagonal direction of the solid state image sensing device, a reduction in quantity of peripheral light or the like being thereby called for. In order to correct the field curvature properly, the following expression is preferably satisfied:

$$0.5 < |f2/f3| < 5$$

In addition, letting the focal length of the first lens be f1 and a composite focal length of the second lens and the third lens be f23, the following conditional expression is satisfied:

$$0.2 < |f1/f23| < 6 \qquad (3)$$

When an upper limit of the conditional expression (3) is surpassed, picking up images at wide angles becomes difficult, and as the same time, the field curvature is increased, making it difficult to obtain a good image. On the contrary, when a lower limit is surpassed, although images can be picked up at wide angles, the coma aberration is increased, and it becomes difficult to obtain a good image on a peripheral portion of the image plane. In addition, in order to correct properly the field curvature and the coma aberration, the following conditional expression is desirably satisfied:

$$0.2<|f/f23|<5.5$$

Additionally, letting a focal length of the imaging lens be f, the following expression is satisfied:

$$0<L/f<15 \qquad (4)$$

When an upper limit of the conditional expression (4) is surpassed, the overall length of the lens becomes long, and it becomes difficult to miniaturize the lens. In addition, in order to increase further the miniaturization of the lens and the image pick-up at wide angles, the following conditional expression is desirably satisfied:

$$4<L/f<8$$

A camera system of the invention comprises: the imaging lens configured as has been described heretofore; and a solid state image sensing device that converts an optical image formed by the imaging lens into an electric signal.

DETAILED DESCRIPTION OF THE INVENTION

Figure 22:
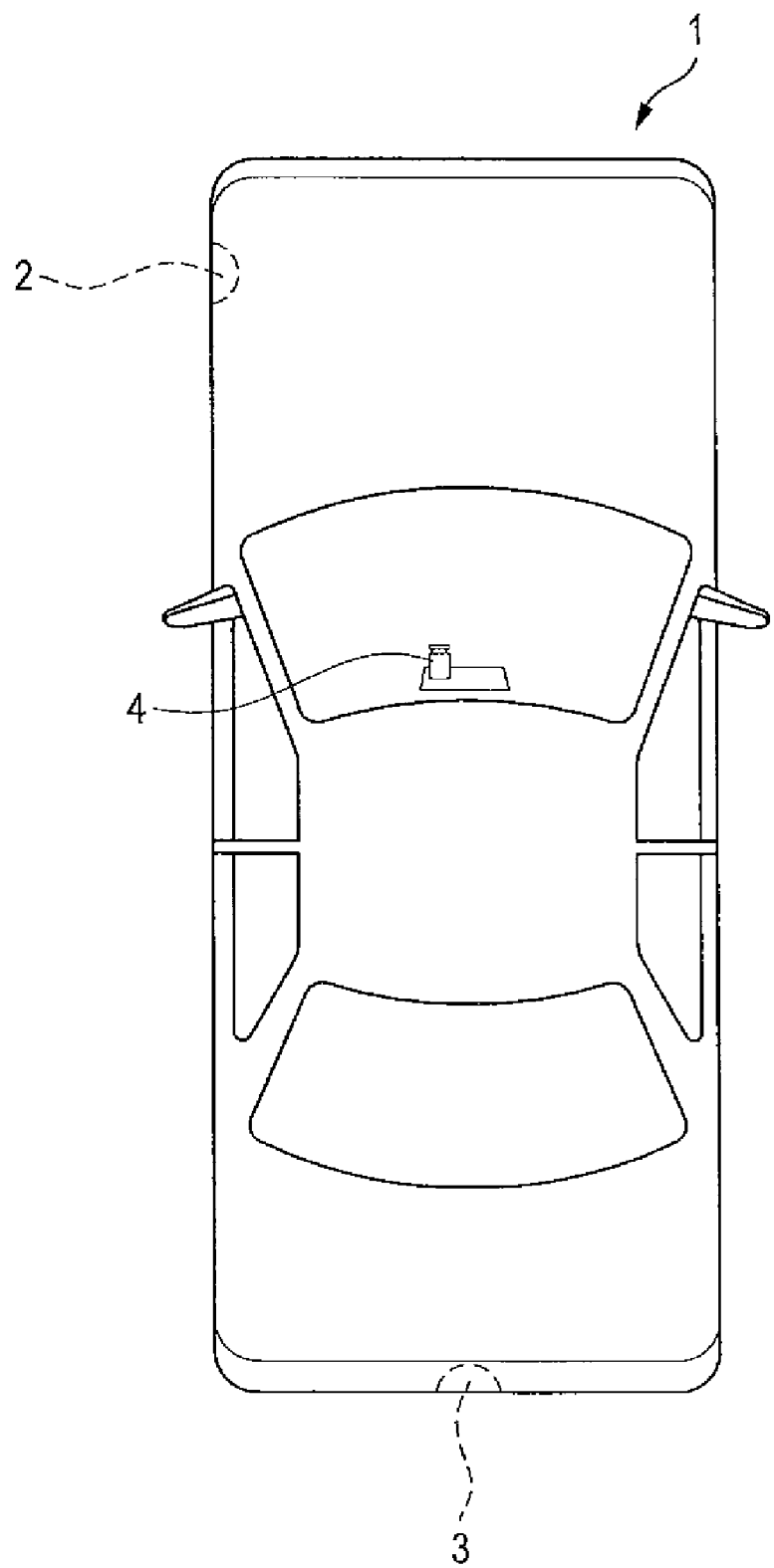
FIG. 22 is an explanatory view of onboard cameras.

In FIG. 22, equipped on a motor vehicle 1 are an outside camera 2 for picking up images of surroundings of the vehicle 1 which lie in a blind area to the driver which is located close to a side of the vehicle 1 where a front passenger's seat is fitted, an outside camera 3 for pick up images of surroundings of the vehicle 1 in a blind area to the driver which is located at the rear of the vehicle 1 and an inside camera 4 for picking up images of surroundings of the vehicle 1 in the same way as viewed by the driver. The outside camera 2, the outside camera 3 and the inside camera 4 each include an imaging lens 10 and a solid state image sensing device S1 which is made up of a CCD image sensor. A material which has strong resistances to surface deterioration by wind and rain, temperature change by direct sun light, and fats and oils and chemicals such as detergents is used for a lens of the imaging lens 10 which lies in an outermost position on an object side of the lens or nearest to objects. Hereinafter, embodiments of the imaging lens 10 will be described.

Embodiment 1

Figure 1:
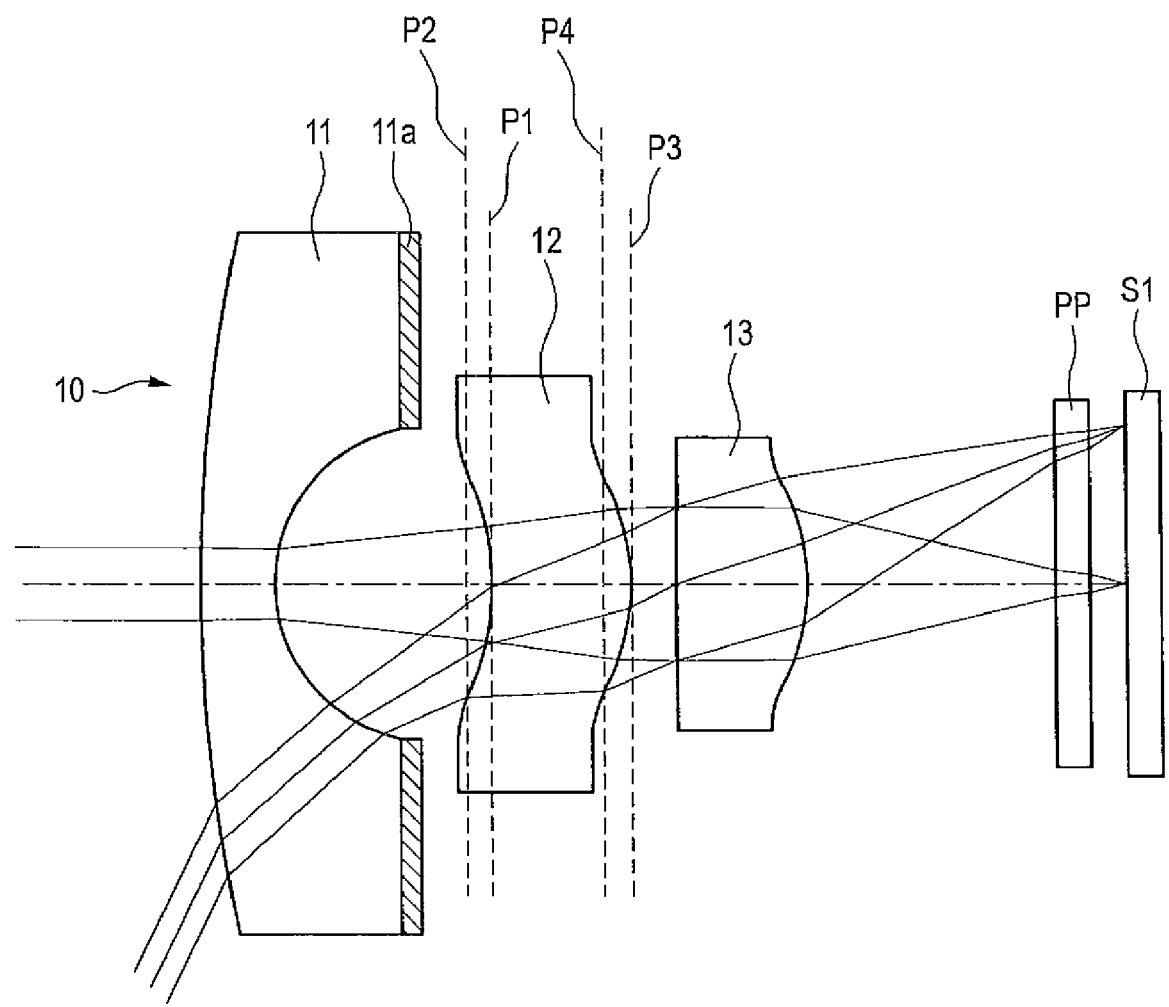
FIG. 1 is a diagram showing an optical path of a first embodiment.
Figure 2:
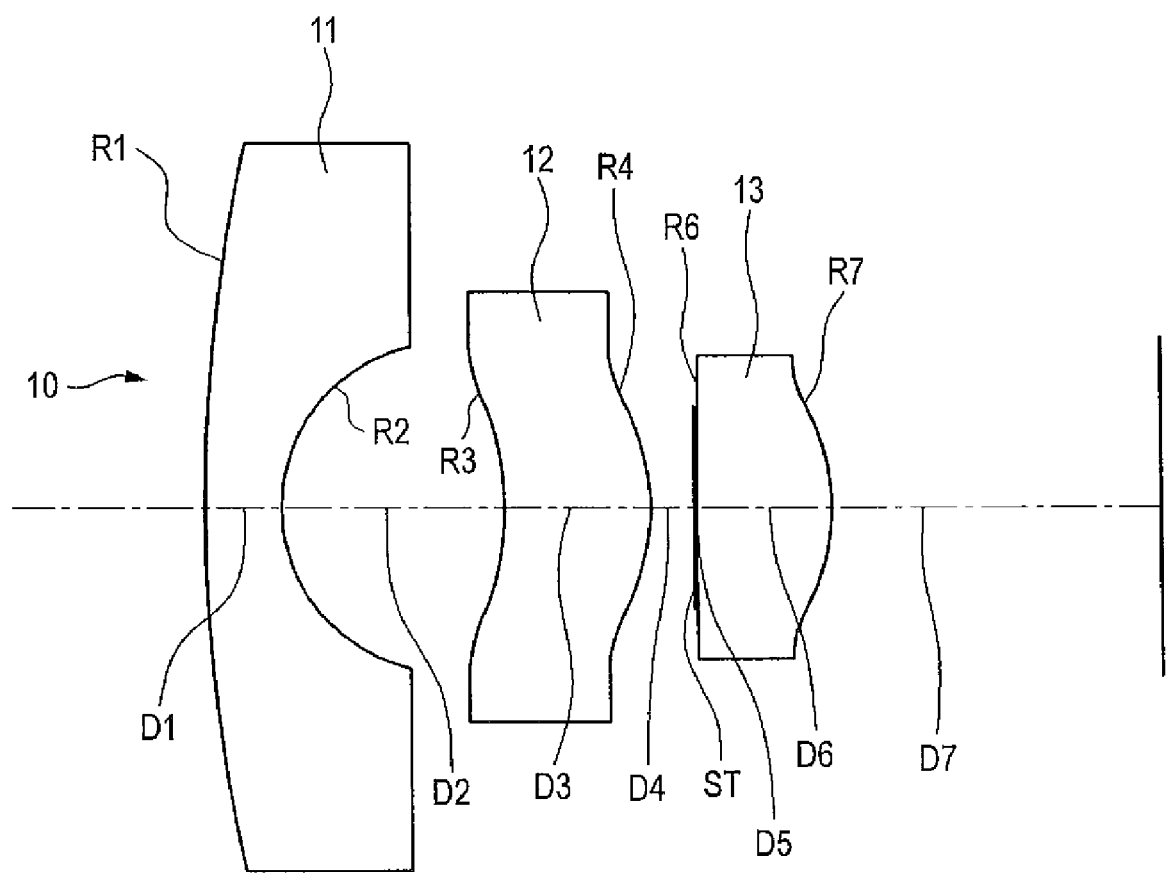
FIG. 2 is a sectional view showing a lens configuration of the first embodiment.

In FIGS. 1 and 2, an imaging lens 10 includes, in order from an object side, a first lens 11, a second lens 12 and a third lens 13. The first lens is made up of a glass spherical lens, which is formed into a negative meniscus shape which has a convex surface on an object side and a concave surface on an image side thereof. A light cut-off film 11a is provided on an area which is located radially outwards of the image side concave surface of the first lens 11. The light cut-off film prevents the entrance of light from the outside of an effective aperture so as to prevent the occurrence of a ghost image on an image plane. In addition, although the light cut-off film 11a is an opaque paint layer which is provided on the outside of the effective aperture, an opaque plate material may be provided on a rear side of the first lens 11. In addition, the position where the light cut-off film 11a is provided is not limited to the rear of the first lens 11 but may be provided between the other lenses as required.

The second lens 12 is made up of a plastic lens, which is formed into a positive meniscus shape which has a concave surface on an object side and a convex lens on an image side thereof and in which the object side concave surface and the image side convex surface are both aspherical surfaces which are rotationally symmetric about an optical axis. The second lens 12 is such that an intersection point between the object side surface and the optical axis lies closer to an image side of the imaging lens than an effective aperture terminating edge does through which an outermost angular light ray enters. Namely, as is shown in FIG. 1, an intersection point plane P1 which includes the intersection point between the object side surface and the optical axis is situated closer to the image side of the imaging lens than a plane P2 does which includes the effective aperture terminating edge and which is perpendicular to the optical axis. In addition, an intersection point between the image side surface of the second lens 12 and the optical axis is situated closer to the image side of the imaging lens than an effective aperture terminating edge is through which an outermost angular light ray enters, and an intersection point plane P3 which includes the intersection point between the image side surface of the second lens 12 and the optical axis is situated closer to the image side of the imaging lens than a plane P4 is which includes the effective aperture terminating edge.

The third lens 13 is made up of a plastic lens, which is formed into a positive meniscus shape which has a concave surface on an object side and a convex surface on an image side thereof and in which both the object side concave surface and the image side convex surface are aspherical surfaces. An aperture stop ST is provided between the second lens 12 and the third lens 13. A light receiving surface of the solid state image sensing device S1 which is made up of a CCD image sensor or a CMOS image sensor is situated on an image plane, and a parallel, flat-plane plate PP is provided between the third lens 13 and the image plane as a filter device such as a cover glass or infrared ray cut-off filter for the solid state image sensing device S1 (refer to FIG. 1). Lens data of the imaging lens 10 are shown in Table 1 below, aspherical coefficients of the second lens 12 and the third lens 13 are shown in Table 2 below, and design specifications of the imaging lens 10 are shown in Table 3 below. Note that respective aspherical surfaces are such as to be based on the following aspherical surface expression, which is true with other embodiments, where KA denotes a conic constant, Bi an ith-order aspherical coefficient, C a reciprocal number of a paraxial radius of curvature, Di a coefficient of an ith phase differential function, and Y a height from the optical axis.

$$Z' = \frac{CY^2}{1 + \sqrt{1 - KA * C^2 Y^2}} + \sum B_i Y^i \quad \text{[Expression 1]}$$
$$i = 3 \sim n$$

TABLE 1

| Surface Numbers | | R | D | n | vd |
|---|---|---|---|---|---|
| | 1 | 22.75 | 1.05 | 1.5168 | 64.2 |
| | 2 | 2.26 | 3.04 | | |
| | 3 | −4.88 | 2.00 | 1.58362 | 30.2 |
| | 4 | −2.58 | 0.65 | | |
| ST | 5 | 0.00 | 0.00 | | |
| | 6 | −134.88 | 1.85 | 1.50869 | 56 |
| | 7 | −2.67 | | | |

TABLE 3

| f | 2.22 |
|---|---|
| f1 | −4.92 |
| f2 | 7.04 |
| f3 | 5.30 |
| f12 | 12.08 |
| f23 | 3.24 |
| 2ω | 128 |
| L | 12.92 |
| BF | 4.34 |
| Fno | 2.4 |

Note that in the table, R represents a radius of curvature of a spherical surface of a lens or represents a curvature of a reference surface of an aspherical surface, and D represents an inter surface space or an air space. Nd represents a refractive index relative to a d line (wavelength being 587.56 nm), and vd represents an Abbe number based on the d line. In addition, in the table, f1 represents a focal length (mm) of the first lens 11, f2 a focal length (mm) of the second lens 12, f3 a focal length (mm) of the third lens 13, f12 a composite focal length (mm) of the first lens 11 and the second lens 12, f23 a composite focal length (mm) of the second lens 12 and the third lens 13, 2ω a diagonal angle of view (°), L a distance (mm) from an apex on the object side surface to the image plane, BF a back focus (mm), and Fno an f number. These are the same in the other embodiments which will be described later on.

Figure 3:
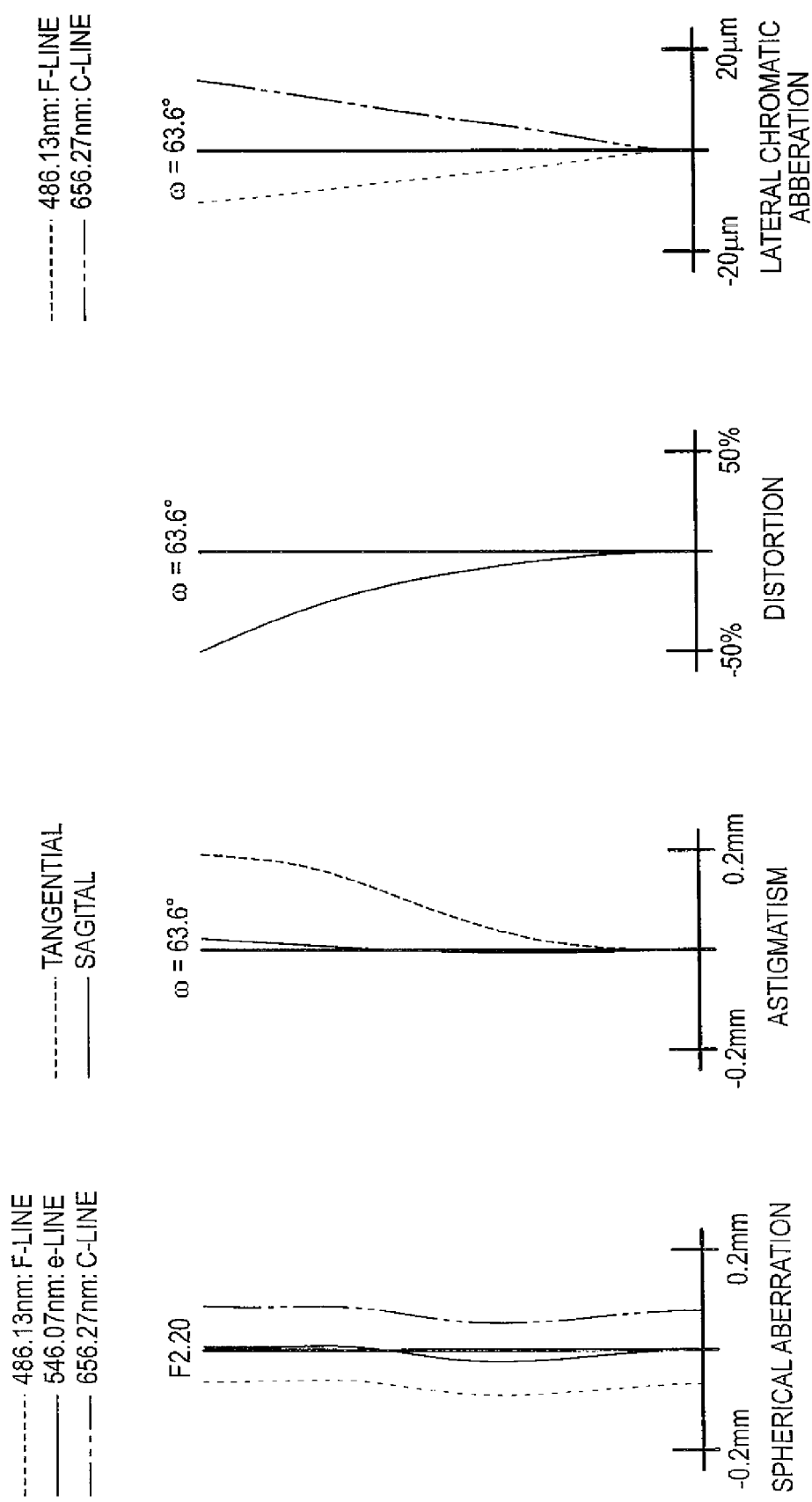
FIG. 3 is an aberration diagrams of the first embodiment.

In the imaging lens 10, |L/f1|=2.62, and the conditional expression (1), 0.5<|L/f1|<7, is satisfied. In addition, |f2/f3|=1.33, and the conditional expression (2), 0.2<|f2/f3|<10, is satisfied. Furthermore, |f1/f23|=1.52, and the conditional expression (3), 0.2<|f1/f23|<6, is satisfied. In addition, L/f=5.81, and the conditional expression (4), 0<L/f<15, is satisfied. FIG. 3 shows aberration diagrams of the imaging lens 10.

Embodiment 2

Figure 4:
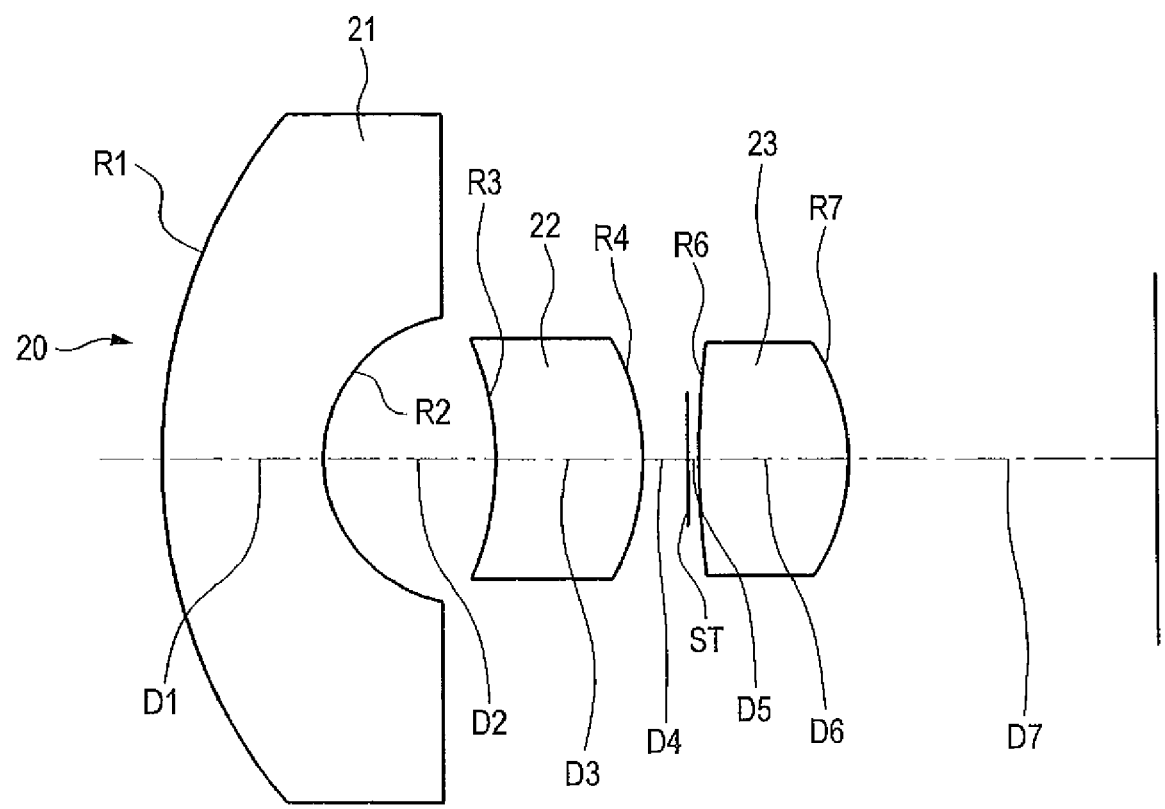
FIG. 4 is a sectional view showing a lens configuration of a second embodiment.
Figure 5:
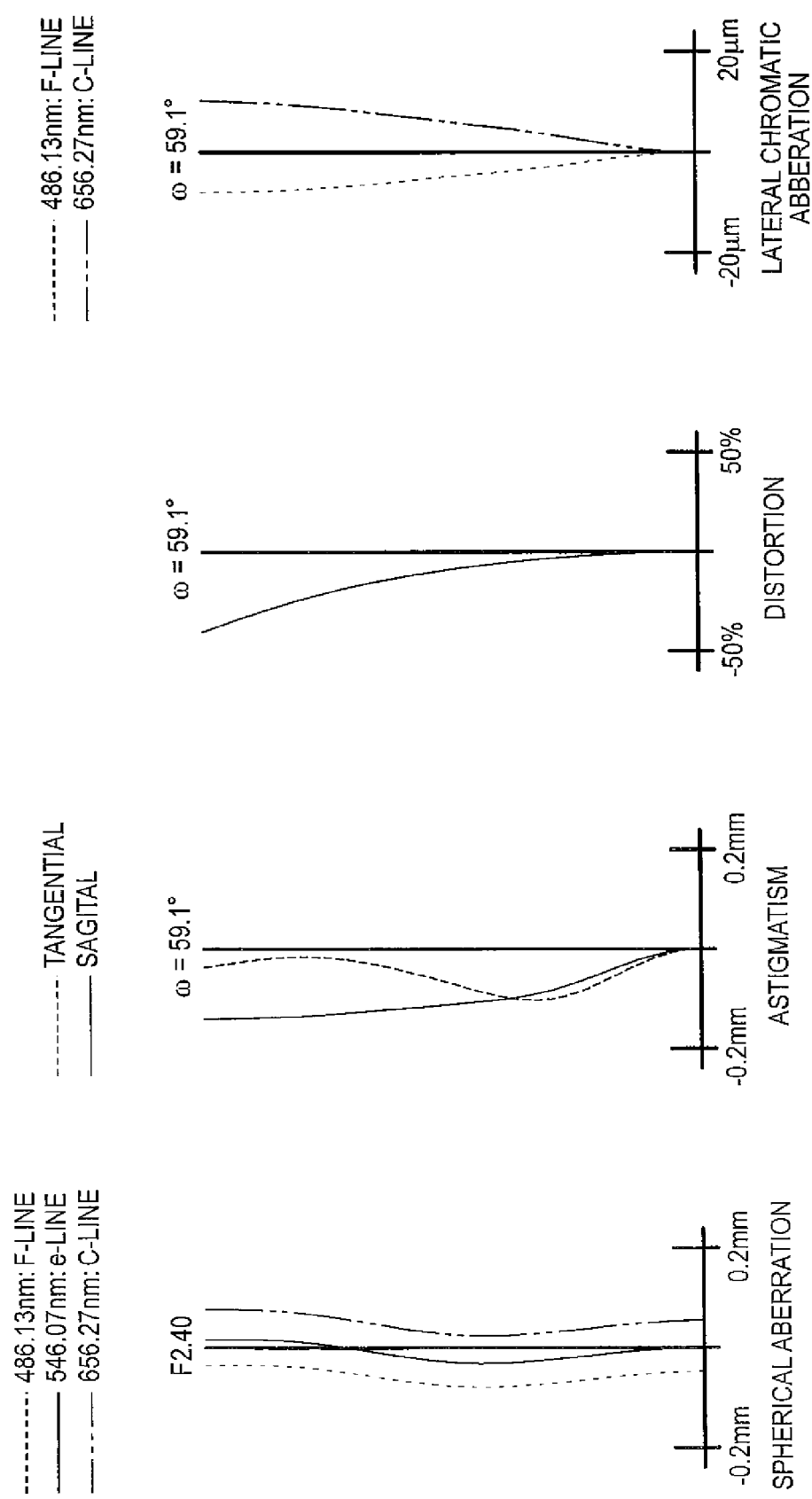
FIG. 5 is an aberration diagrams of the second embodiment.

In FIG. 4, an imaging lens 20 includes, in order from an object side, a first lens 21, a second lens 22 and a third lens 23.

TABLE 2

| Aspherical Coefficients | | | | | | | |
|---|---|---|---|---|---|---|---|
| Surface Numbers | KA | B3 | B4 | B5 | B6 | B7 | B8 |
| 3 | −2.57E+00 | −3.09E−03 | −7.54E−03 | −8.63E−03 | 3.61E−03 | 4.80E−04 | −3.33E−04 |
| 4 | 3.79E−01 | 1.03E−02 | 7.17E−03 | −4.38E−03 | 2.92E−03 | −9.12E−04 | 2.78E−04 |
| 6 | −2.83E+01 | 1.70E−02 | −6.80E−03 | 1.86E−03 | 1.30E−03 | 1.90E−03 | 6.60E−05 |
| 7 | −2.47E+00 | −1.22E−02 | 4.73E−03 | −1.00E−02 | 3.43E−03 | −2.54E−04 | 9.56E−06 |

| Surface Numbers | B9 | B10 | B11 | B12 | B13 | B14 | B15 |
|---|---|---|---|---|---|---|---|
| 3 | 4.87E−07 | 8.20E−06 | −1.67E−07 | 4.05E−07 | 1.87E−07 | 8.51E−08 | 3.89E−08 |
| 4 | −1.14E−05 | −8.40E−06 | −2.67E−06 | 2.78E−07 | 1.07E−06 | 9.45E−07 | 5.94E−07 |
| 6 | −3.98E−04 | −5.58E−04 | −2.34E−05 | −1.80E−05 | −1.32E−05 | −8.40E−06 | −3.79E−06 |
| 7 | −7.44E−06 | 7.54E−07 | −1.31E−06 | −6.06E−07 | −2.51E−07 | −8.62E−08 | −1.80E−08 |

| Surface Numbers | B16 | B17 | B18 |
|---|---|---|---|
| 3 | −9.86E−09 | −8.08E−09 | −4.38E−10 |
| 4 | 2.53E−07 | 1.21E−08 | −1.13E−07 |
| 6 | 2.13E−07 | 2.66E−06 | 3.36E−06 |
| 7 | 6.65E−09 | 1.25E−08 | 1.17E−08 |

The first lens 21 is made up of a glass spherical lens, which is formed into a negative meniscus shape which has a convex surface on an object side and a concave surface on an image side thereof and in which a radius of curvature of the image side concave surface is made smaller. The second lens 22 is made up of a plastic lens, which is formed into a positive meniscus shape which has a concave surface on an object side and a convex surface on an image side thereof and in which both the object side concave surface and the image side convex surface are formed into an aspherical surface. In the second lens 22, an intersection point between the object side surface and an optical axis is situated closer to an image side of the imaging lens than an effective aperture terminating edge of the relevant surface is through which an outermost angular light ray enters, and an intersection point between the image side surface and the optical axis is situated closer to the image side of the imaging lens than an effective aperture terminating edge of the relevant surface is through which an outermost angular light ray enters. The third lens 23 is made up of a plastic lens, which is formed into a double-convex shape which has a convex surface on an object side and a convex surface on an image side thereof and in which both the object side convex surface and the image side convex surface are aspherical surfaces. An aperture stop ST is provided between the second lens 22 and the third element 23. Lens data of the imaging lens 20 are shown in Table 4 below, aspherical coefficients of the second lens 22 and the third lens 23 are shown in Table 5 below, and design specifications of the imaging lens 20 are shown in Table 6 below.

TABLE 4

| Surface Numbers | | R | D | n | vd |
|---|---|---|---|---|---|
| | 1 | 6.55 | 1.99 | 1.5168 | 64.2 |
| | 2 | 1.76 | 2.10 | | |
| | 3 | −4.11 | 1.78 | 1.58362 | 30.2 |
| | 4 | −2.88 | 0.53 | | |
| ST | 5 | 0.00 | 0.16 | | |
| | 6 | 7.49 | 1.84 | 1.50869 | 56 |
| | 7 | −2.32 | | | |

TABLE 5

| | Aspherical Coefficients | | | | | | |
|---|---|---|---|---|---|---|---|
| Surface Numbers | KA | B3 | B4 | B5 | B6 | B7 | B8 |
| 3 | −2.49E+00 | 7.72E−03 | −1.64E−02 | −9.24E−03 | 3.61E−03 | 4.82E−04 | −3.33E−04 |
| 4 | 5.45E−01 | 1.97E−03 | 3.37E−03 | −4.66E−03 | 2.92E−03 | −9.09E−04 | 2.78E−04 |
| 6 | −2.83E+01 | 6.80E−04 | −9.58E−03 | 1.88E−03 | 1.33E−03 | 1.90E−03 | 6.66E−05 |
| 7 | −2.74E+00 | −1.89E−02 | 1.32E−03 | −1.12E−02 | 3.25E−03 | −2.71E−04 | 8.22E−06 |

| Surface Numbers | B9 | B10 | B11 | B12 | B13 | B14 | B15 |
|---|---|---|---|---|---|---|---|
| 3 | 4.54E−07 | 8.20E−06 | −1.68E−07 | 4.04E−07 | 1.87E−07 | 8.51E−08 | 3.89E−08 |
| 4 | −1.13E−05 | −8.40E−06 | −2.67E−06 | 2.78E−07 | 1.07E−06 | 9.45E−07 | 5.94E−07 |
| 6 | −3.98E−04 | −5.58E−04 | −2.34E−05 | −1.80E−05 | −1.32E−05 | −8.40E−06 | −3.79E−06 |
| 7 | −7.51E−06 | 7.52E−07 | −1.31E−06 | −6.06E−07 | −2.51E−07 | −8.62E−08 | −1.80E−08 |

| Surface Numbers | B16 | B17 | B18 |
|---|---|---|---|
| 3 | −9.86E−09 | −8.08E−09 | −4.38E−10 |
| 4 | 2.53E−07 | 1.21E−08 | −1.13E−07 |
| 6 | 2.13E−07 | 2.66E−06 | 3.36E−06 |
| 7 | 6.65E−09 | 1.25E−08 | 1.17E−08 |

TABLE 6

| f | 2.24 |
|---|---|
| f1 | −5.39 |
| f2 | 10.64 |
| f3 | 3.71 |
| f12 | −45.03 |
| f23 | 2.75 |
| 2ω | 118 |
| L | 11.98 |
| BF | 3.58 |
| Fno | 2.4 |

In the imaging lens 20, |L/f1|=2.22, and the conditional expression (1), 0.5<|L/f1|<7, is satisfied. In addition, |f2/f3|=2.87, and the conditional expression (2), 0.2<|f2/f3|<10, is satisfied. Furthermore, |f1/f23|=1.96, and the conditional expression (3), 0.2<|f1/f23|<6, is satisfied. L/f=5.34, and the conditional expression (4), 0<L/f<15, is satisfied.

Embodiment 3

Figure 6:
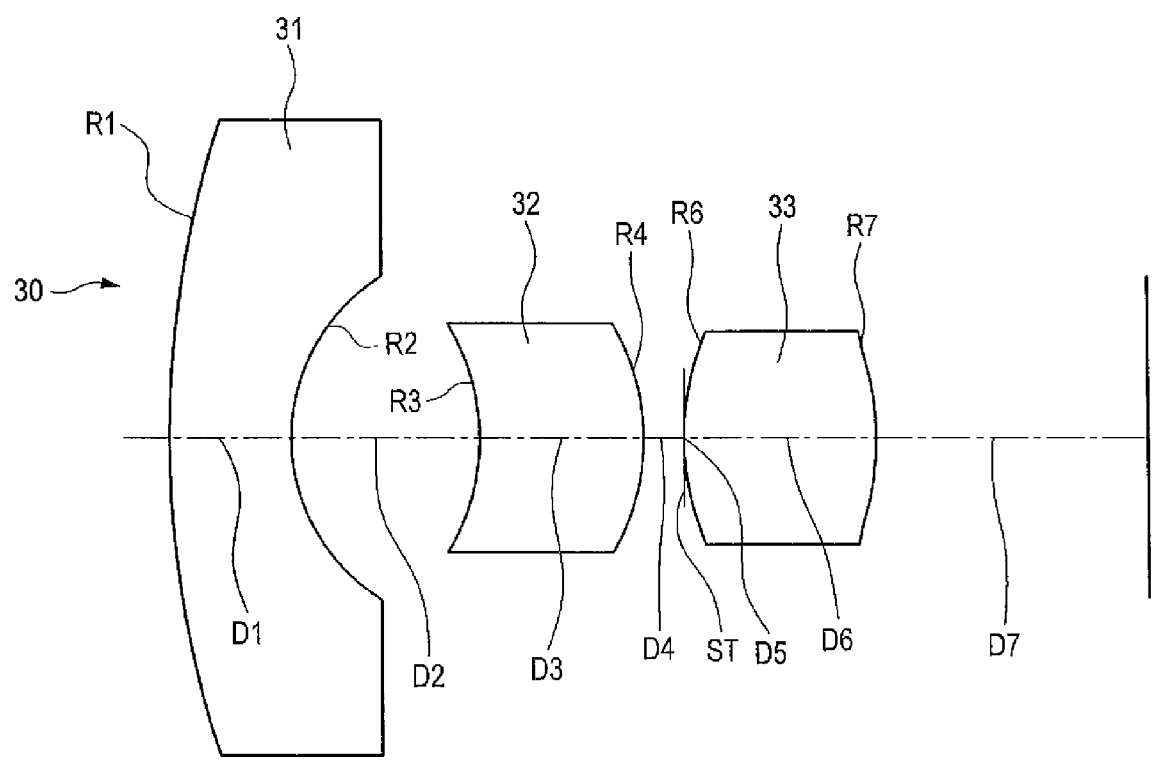
FIG. 6 is a sectional view showing a lens configuration of a third embodiment.
Figure 7:
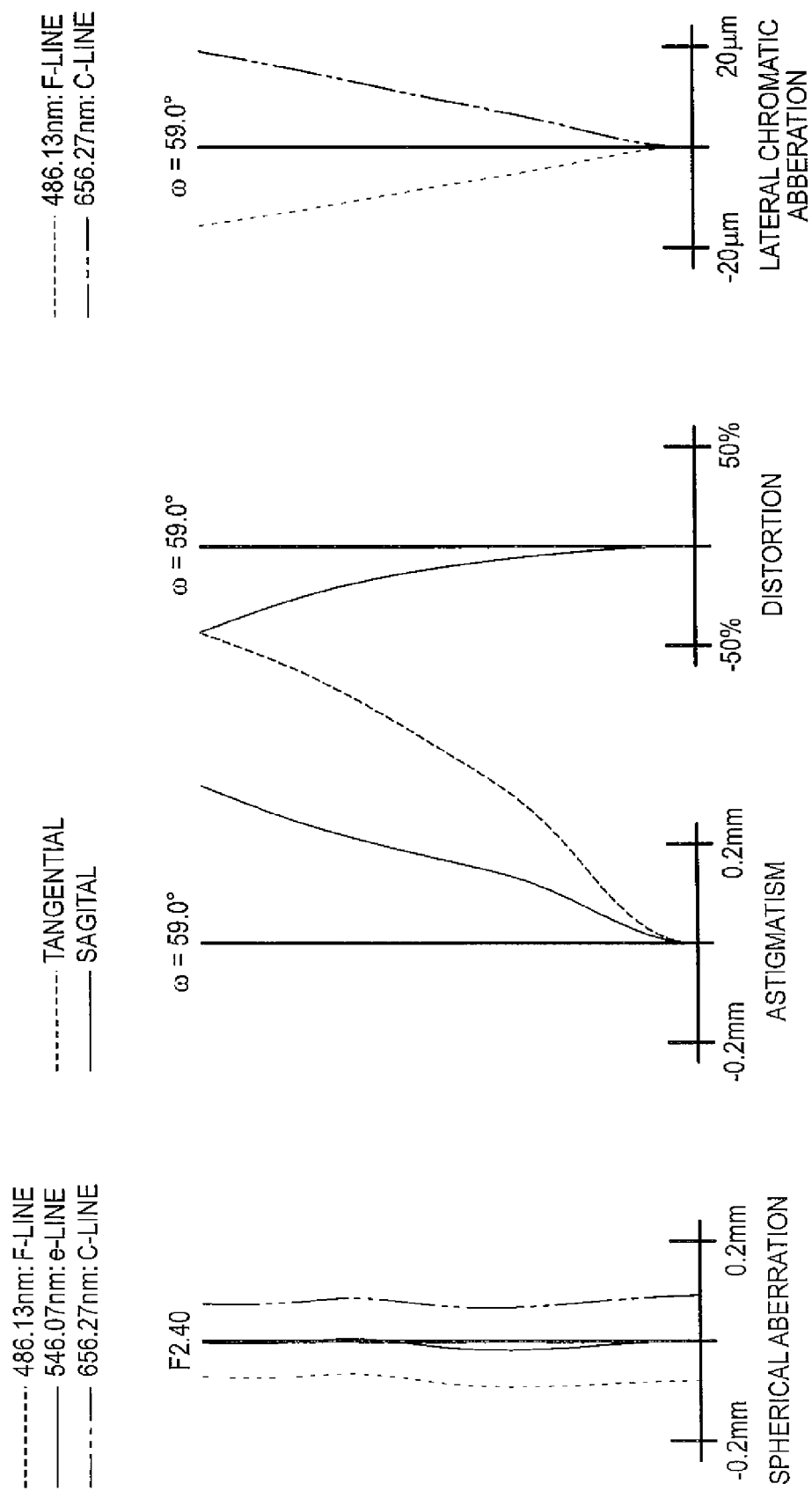
FIG. 7 is an aberration diagrams of the third embodiment.

In FIG. 6, an imaging lens 30 includes, in order from an object side, a first lens 31, a second lens 32 and a third lens 33. The first lens 31 is made up of a glass spherical lens, which is formed into a negative meniscus shape which has a convex surface on an object side and a concave surface on an image side thereof. The second lens 32 is made up of a plastic lens, which is formed into a positive meniscus shape which has a concave surface on an object side and a convex surface on an image side thereof and in which both the surfaces are aspherical surfaces. In the second lens 32, an intersection point between the object side surface and an optical axis is situated closer to the image side of the imaging lens than an effective aperture terminating edge of the relevant surface is through which an outermost angular light ray enters, and an intersection point between the image side surface and the optical axis is situated closer to the image side of the imaging lens than an effective aperture terminating edge of the relevant surface is through which an outermost angular light ray enters. The third lens 33 is made up of a plastic lens, which is formed into a double-convex shape which has a convex surface on an object side and a convex surface on an image side thereof and in which both the surfaces are aspherical surfaces. An aperture stop ST is provided between the second lens 32 and the third element 33. Lens data of the imaging lens 30 are shown in Table 7 below, aspherical coefficients of the second lens 32 and the third lens 33 are shown in Table 8 below, and design specifications of the imaging lens 30 are shown in Table 9 below. FIG. 7 shows aberration diagrams of the imaging lens 30.

TABLE 7

| | Surface Numbers | R | D | n | vd |
|---|---|---|---|---|---|
| | 1 | 16.74 | 2.03 | 1.5168 | 64.2 |
| | 2 | 3.19 | 3.16 | | |
| | 3 | −3.42 | 2.73 | 1.58362 | 30.2 |
| | 4 | −2.55 | 0.67 | | |
| ST | 5 | 0.00 | 0.03 | | |
| | 6 | 13.99 | 3.21 | 1.50869 | 56 |
| | 7 | −4.21 | | | |

TABLE 8

Aspherical Coefficients

| Surface Numbers | KA | B3 | B4 | B5 | B6 | B7 | B8 |
|---|---|---|---|---|---|---|---|
| 3 | −2.75E+00 | −1.02E−02 | −3.98E−04 | −8.13E−03 | 3.64E−03 | 4.77E−04 | −3.38E−04 |
| 4 | 3.00E−01 | 2.44E−02 | 4.31E−03 | −3.40E−03 | 3.15E−03 | −8.82E−04 | 2.71E−04 |
| 6 | −3.52E+01 | 3.82E−02 | −6.31E−03 | 1.70E−03 | 1.41E−03 | 2.03E−03 | 1.67E−04 |
| 7 | −2.78E+00 | −8.98E−03 | 1.43E−02 | −8.63E−03 | 3.51E−03 | −2.52E−04 | 1.13E−05 |

| Surface Numbers | B9 | B10 | B11 | B12 | B13 | B14 | B15 |
|---|---|---|---|---|---|---|---|
| 3 | −4.03E−07 | 8.68E−06 | 5.03E−07 | 3.65E−07 | 2.06E−07 | 9.46E−08 | 3.01E−08 |
| 4 | −2.29E−05 | −1.81E−05 | −9.14E−06 | −3.65E−06 | −1.07E−06 | −7.24E−08 | 2.12E−07 |
| 6 | −3.28E−04 | −5.13E−04 | 4.36E−06 | −1.80E−06 | −4.36E−06 | −4.07E−06 | −2.06E−06 |
| 7 | −6.55E−06 | 9.52E−07 | −1.28E−06 | −6.10E−07 | −2.66E−07 | −8.04E−08 | −6.35E−09 |

| Surface Numbers | B16 | B17 | B18 |
|---|---|---|---|
| 3 | −2.34E−10 | −1.12E−08 | −1.27E−08 |
| 4 | 2.02E−07 | 1.17E−07 | 4.26E−08 |
| 6 | 5.06E−07 | 2.21E−06 | 2.58E−06 |
| 7 | 1.81E−08 | 2.13E−08 | 1.79E−08 |

TABLE 9

| | |
|---|---|
| f | 2.83 |
| f1 | −8.01 |
| f2 | 7.88 |
| f3 | 6.73 |
| f12 | 10.38 |
| f23 | 3.66 |
| 2ω | 118 |
| L | 16.19 |
| BF | 4.36 |
| Fno | 2.40 |

In the imaging lens 30, $|L/f1|=2.02$, and the conditional expression (1), $0.5<|L/f1|<7$, is satisfied. In addition, $|f2/f3|=1.17$, and the conditional expression (2), $0.2<|f2/f3|<10$, is satisfied. Furthermore, $|f1/f23|=2.19$, and the conditional expression (3), $0.2<|f1/f23|<6$, is satisfied. $L/f=5.73$, and the conditional expression (4), $0<L/f<15$, is satisfied.

Embodiment 4

Figure 8:
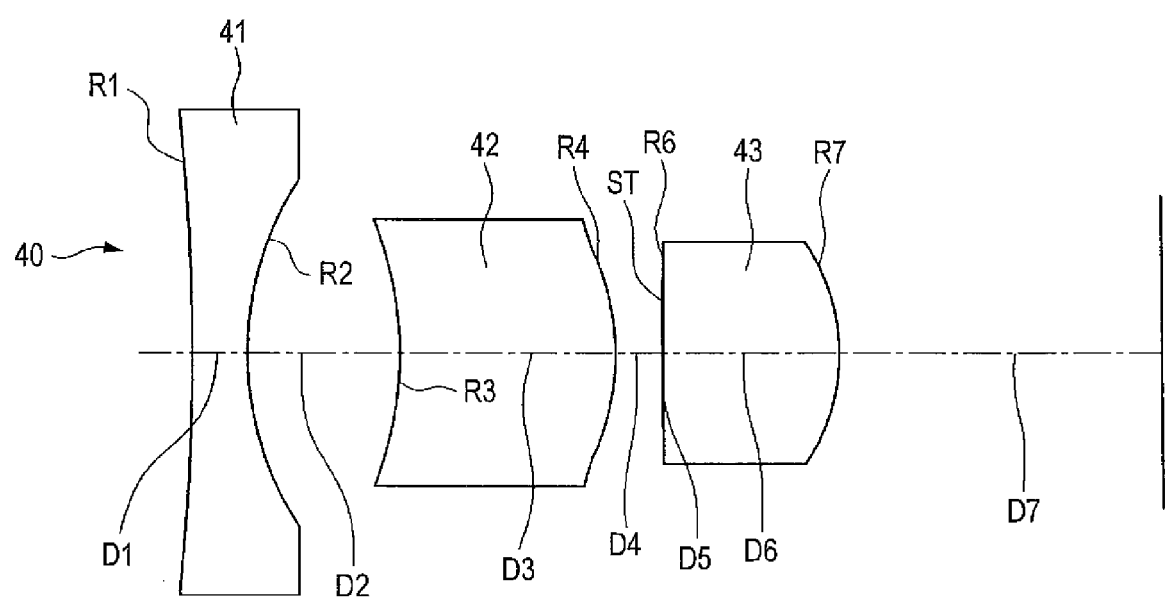
FIG. 8 is a sectional view showing a lens configuration of a fourth embodiment.
Figure 9:
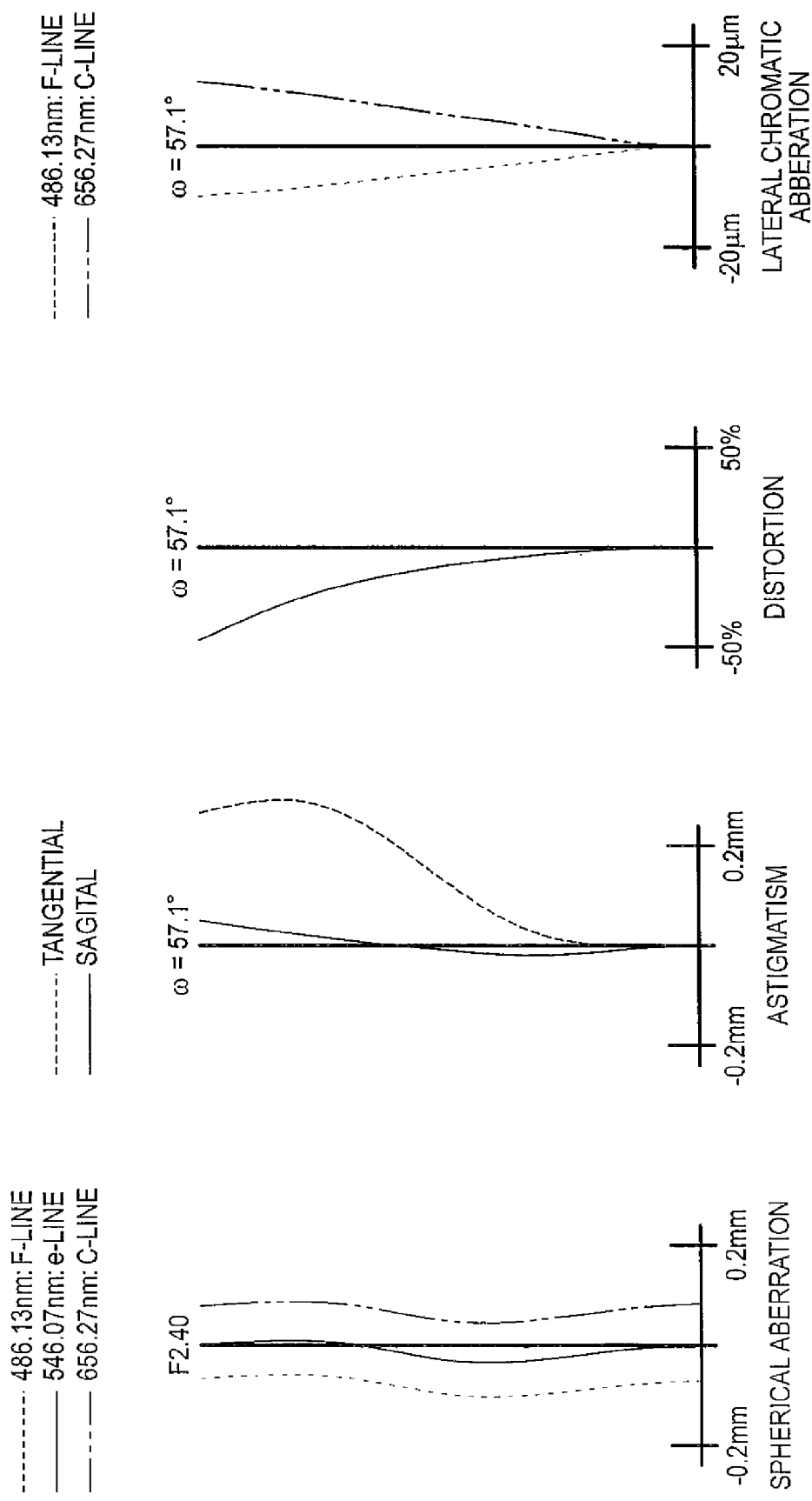
FIG. 9 is an aberration diagrams of the fourth embodiment.

In FIG. 8, an imaging lens 40 includes, in order from an object side, a first lens 41, a second lens 42 and a third lens 43. The first lens 41 is made up of a glass spherical lens, which is formed into a double-concave shape which has a concave surface on an object side and a concave surface on an image side thereof. The second lens 42 is made up of a plastic lens, which is formed into a positive meniscus shape which has a concave surface on an object side and a convex surface on an image side thereof and in which both the surfaces are aspherical surfaces. In the second lens 42, an intersection point between the object side surface and an optical axis is situated closer to an image side of the imaging lens than an effective aperture terminating edge of the relevant surface is through which an outermost angular light ray enters, and an intersection point between the image side surface and the optical axis is situated closer to the image side of the imaging lens than an effective aperture terminating edge of the relevant surface is through which an outermost angular light ray enters. The third lens 43 is made up of a plastic lens, which is formed into a positive meniscus shape which has a concave surface on an object side and a convex surface on an image side thereof and in which both the surfaces are aspherical surfaces. An aperture stop ST is provided between the second lens 42 and the third element 43. Lens data of the imaging lens 40 are shown in Table 10 below, aspherical coefficients of the second lens 42 and the third lens 43 are shown in Table 11 below, and design specifications of the imaging lens 40 are shown in Table 12 below. FIG. 9 shows aberration diagrams of the imaging lens 40.

TABLE 10

| Surface Numbers | R | D | n | vd |
|---|---|---|---|---|
| 1 | −31.57 | 0.81 | 1.5168 | 64.2 |
| 2 | 4.55 | 2.19 | | |
| 3 | −5.28 | 3.11 | 1.58362 | 30.2 |
| 4 | −2.71 | 0.71 | | |
| ST 5 | 0.00 | 0.00 | | |
| 6 | −12.91 | 2.49 | 1.50869 | 56 |
| 7 | −2.70 | | | |

TABLE 11

Aspherical Coefficients

| Surface Numbers | KA | B3 | B4 | B5 | B6 | B7 | B8 |
|---|---|---|---|---|---|---|---|
| 3 | −2.58E+00 | 2.35E−04 | −3.43E−03 | −7.77E−03 | 3.69E−03 | 4.83E−04 | −3.33E−04 |
| 4 | 2.30E−01 | 1.29E−02 | 1.04E−02 | −4.31E−03 | 2.89E−03 | −9.16E−04 | 2.77E−04 |
| 6 | −2.83E+01 | 2.06E−02 | −7.09E−03 | 2.00E−03 | 1.32E−03 | 1.90E−03 | 6.62E−05 |
| 7 | −2.60E+00 | −1.28E−02 | 5.16E−03 | −1.03E−02 | 3.36E−03 | −2.62E−04 | 8.68E−06 |

| Surface Numbers | B9 | B10 | B11 | B12 | B13 | B14 | B15 |
|---|---|---|---|---|---|---|---|
| 3 | 2.89E−07 | 8.17E−06 | −1.72E−07 | 4.04E−07 | 1.87E−07 | 8.51E−08 | 3.89E−08 |
| 4 | −1.14E−05 | −8.41E−06 | −2.67E−06 | 2.78E−07 | 1.07E−06 | 9.45E−07 | 5.94E−07 |
| 6 | −3.98E−04 | −5.58E−04 | −2.34E+00 | −1.80E−05 | −1.32E−05 | −8.40E−06 | −3.79E−06 |
| 7 | −7.52E−06 | 7.46E−07 | −1.31E−06 | −6.06E−07 | −2.51E−07 | −8.62E−08 | −1.80E−08 |

| Surface Numbers | B16 | B17 | B18 |
|---|---|---|---|
| 3 | −9.86E−09 | −8.08E−09 | −4.38E−10 |
| 4 | 2.53E−07 | 1.21E−08 | −1.13E−07 |
| 6 | 2.13E−07 | 2.66E−06 | 3.36E−06 |
| 7 | 6.65E−09 | 1.25E−08 | 1.17E−08 |

TABLE 12

| | |
|---|---|
| f | 2.71 |
| f1 | −7.61 |
| f2 | 6.54 |
| f3 | 6.16 |
| f12 | 8.16 |
| f23 | 3.51 |
| 2ω | 114 |
| L | 13.80 |
| BF | 4.50 |
| Fno | 2.40 |

In the imaging lens 40, |L/f1|=1.81, and the conditional expression (1), 0.5<|L/f1|<7, is satisfied. In addition, |f2/f3|=1.06, and the conditional expression (2), 0.2<|f2/f3|<10, is satisfied. Furthermore, |f1/f23|=2.17, and the conditional expression (3), 0.2<|f1/f23|<6, is satisfied. L/f=5.09, and the conditional expression (4), 0<L/f<15, is satisfied.

Embodiment 5

Figure 10:
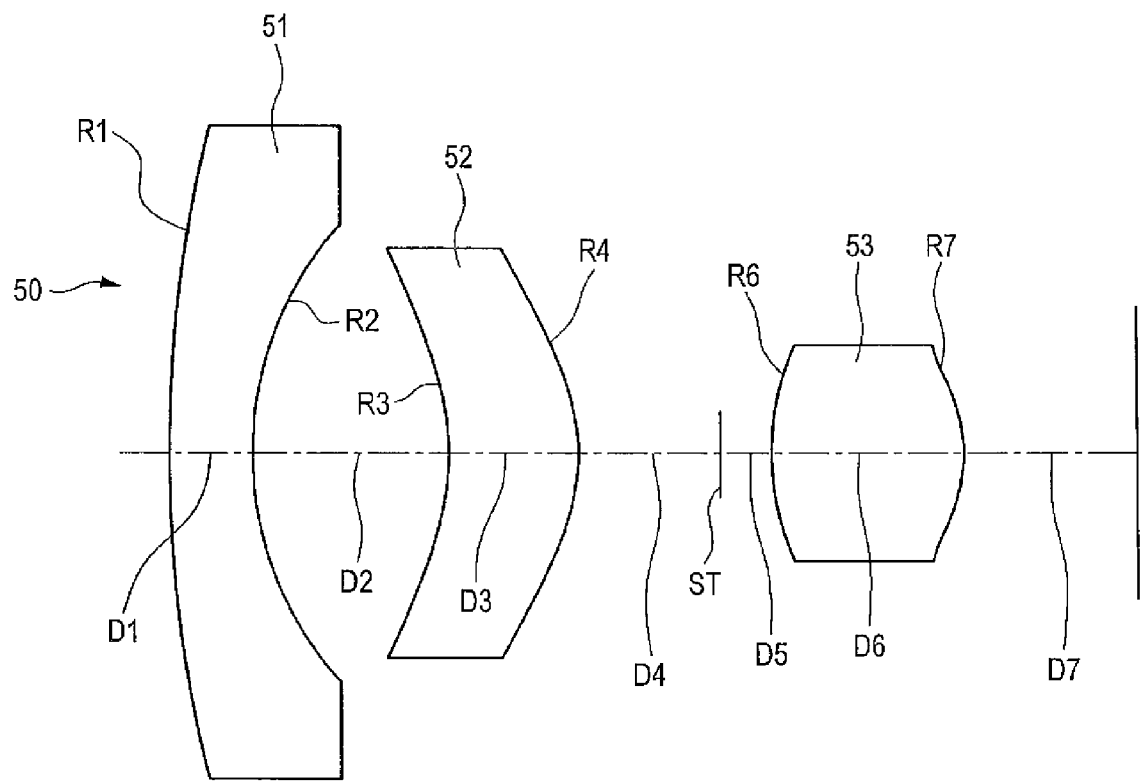
FIG. 10 is a sectional view showing a lens configuration of a fifth embodiment.
Figure 11:
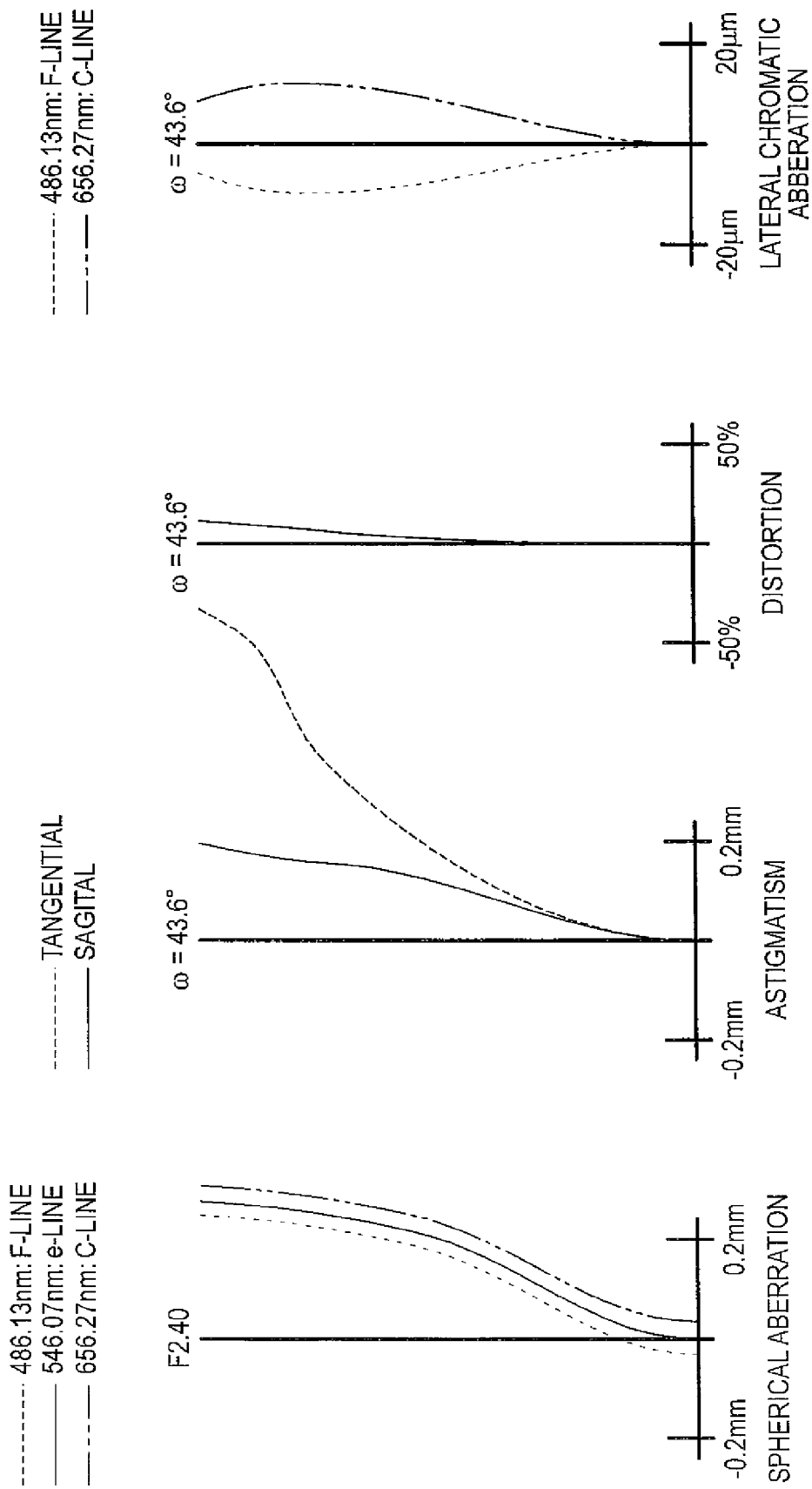
FIG. 11 is an aberration diagrams of the fifth embodiment.

In FIG. 10, an imaging lens 50 includes, in order from an object side, a first lens 51, a second lens 52 and a third lens 53. The first lens 51 is made up of a glass spherical lens, which is formed into a negative meniscus shape which has a convex surface on an object side and a concave surface on an image side thereof. The second lens 52 is made up of a plastic lens, which is formed into a positive meniscus shape which has a concave surface on an object side and a convex surface on an image side thereof and in which both the surfaces are aspherical surfaces. In the second lens 52, an intersection point between the object side surface and an optical axis is situated closer to an image side of the imaging lens than an effective aperture terminating edge of the relevant surface is through which an outermost angular light ray enters, and an intersection point between the image side surface and the optical axis is situated closer to the image side of the imaging lens than an effective aperture terminating edge of the relevant surface is through which an outermost angular light ray enters. The third lens 53 is made up of a plastic lens, which is formed into a double-convex shape which has a convex surface on an object side and a convex surface on an image side thereof and in which both the surfaces are aspherical surfaces. An aperture stop ST is provided between the second lens 52 and the third element 53. Lens data of the imaging lens 50 are shown in Table 13 below, aspherical coefficients of the second lens 52 and the third lens 53 are shown in Table 14 below, and design specifications of the imaging lens 50 are shown in Table 15 below. FIG. 11 shows aberration diagrams of the imaging lens 50.

TABLE 13

| Surface Numbers | R | D | n | vd |
|---|---|---|---|---|
| 1 | 21.26 | 1.37 | 1.5168 | 64.2 |
| 2 | 5.48 | 3.09 | | |
| 3 | −2.96 | 2.08 | 1.58362 | 30.2 |
| 4 | −2.60 | 2.28 | | |
| ST 5 | 0.00 | 0.82 | | |
| 6 | 4.55 | 3.09 | 1.50869 | 56 |
| 7 | −2.03 | | | |

TABLE 14

Aspherical Coefficients

| Surface Numbers | KA | B3 | B4 | B5 | B6 |
|---|---|---|---|---|---|
| 3 | −4.62E+00 | 1.50E−02 | −7.54E−04 | −1.83E−03 | 2.11E−04 |
| 4 | 3.20E−01 | 4.09E−02 | 3.56E−03 | −4.13E−03 | 7.17E−04 |
| 6 | 3.96E−01 | −6.22E−03 | −3.47E−03 | 8.88E−03 | −2.00E−03 |
| 7 | −2.29E+00 | −2.70E−02 | 1.54E−02 | −3.56E−03 | 3.70E−03 |

TABLE 15

| | |
|---|---|
| f | 2.17 |
| f1 | −14.67 |
| f2 | 11.55 |
| f3 | 3.26 |
| f12 | 18.20 |
| f23 | 2.89 |
| 2ω | 80.30 |
| L | 15.08 |
| BF | 2.37 |
| Fno | 2.40 |

In the imaging lens 50, |L/f|=1.03, and the conditional expression (1), 0.5<|L/f1|<7, is satisfied. In addition, |f2/f3|=3.54, and the conditional expression (2), 0.2<|f2/f3|<10, is satisfied. Furthermore, |f1/f23|=5.08, and the conditional expression (3), 0.2<|f1/f23|<6, is satisfied. L/f=6.96, and the conditional expression (4), 0<L/f<15, is satisfied.

Embodiment 6

Figure 12:
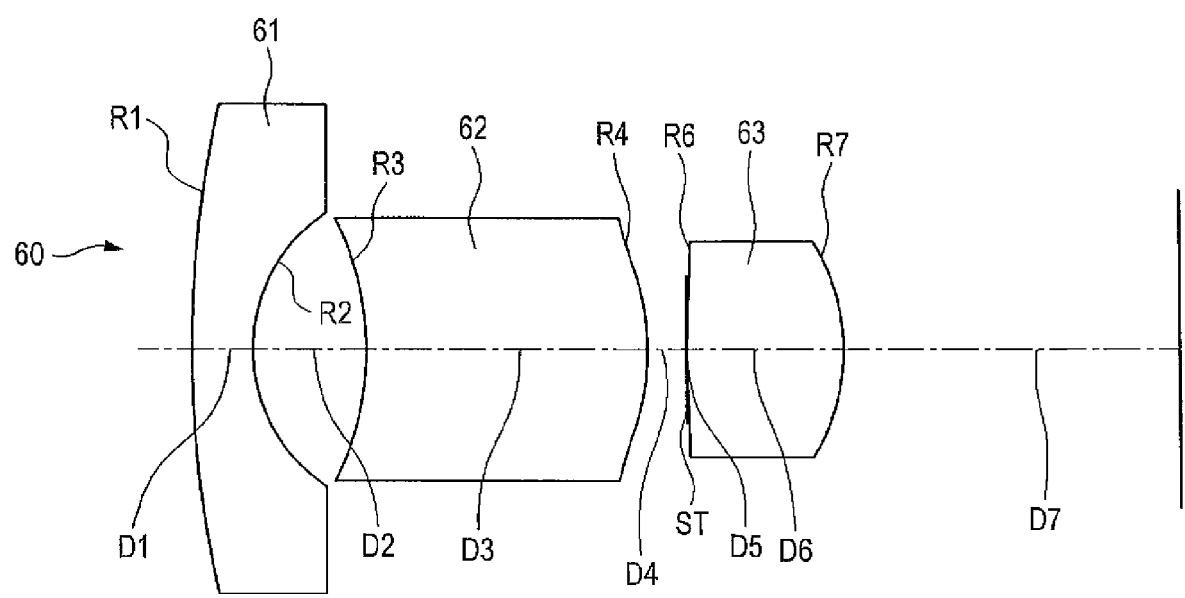
FIG. 12 is a sectional view showing a lens configuration of a sixth embodiment.
Figure 13:
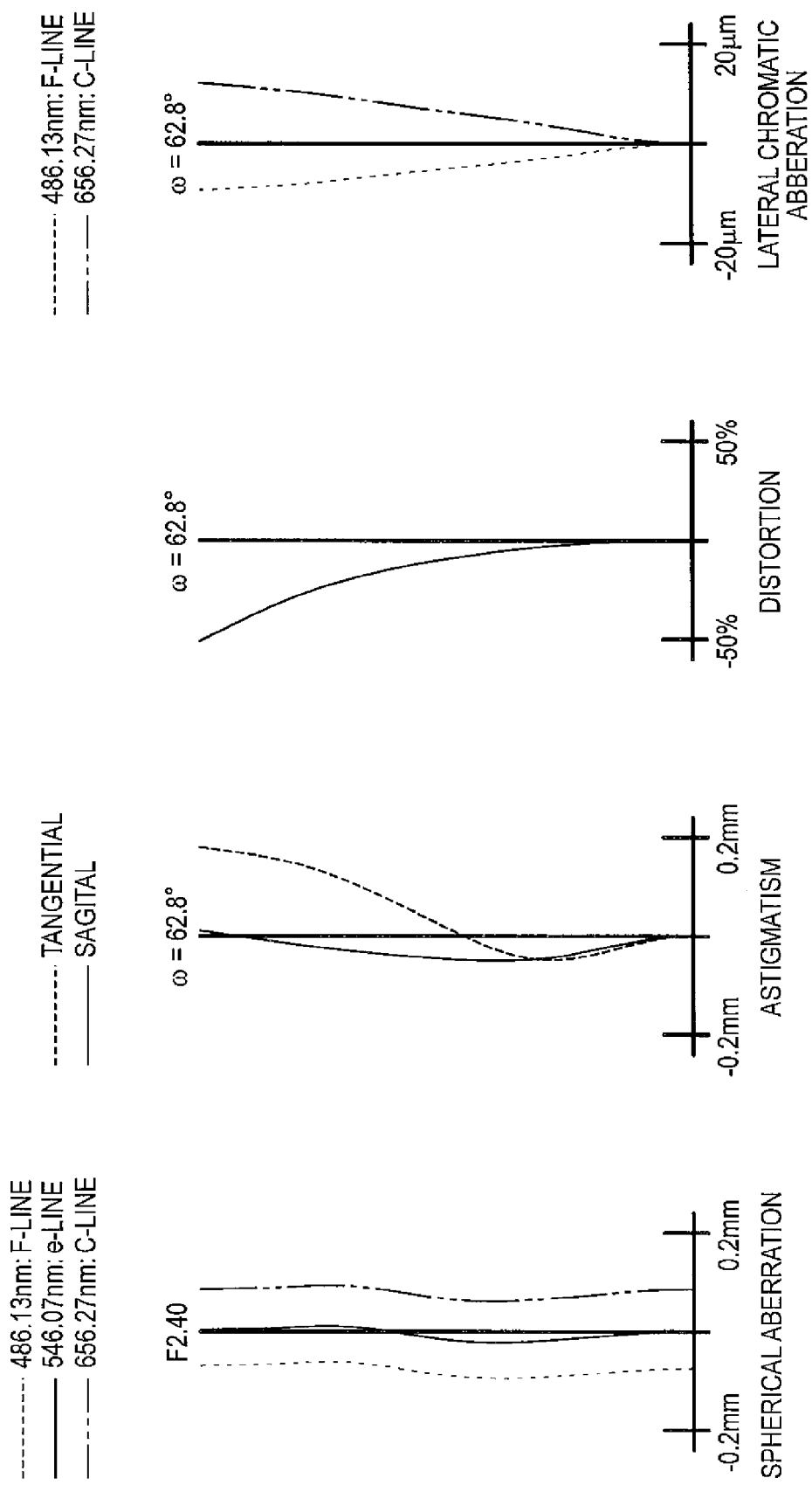
FIG. 13 is an aberration diagrams of the sixth embodiment.

In FIG. 12, an imaging lens 60 includes, in order from an object side, a first lens 61, a second lens 62 and a third lens 63. The first lens 61 is made up of a glass spherical lens, which is formed into a negative meniscus shape which has a convex surface on an object side and a concave surface on an image side thereof. The second lens 62 is made up of a plastic lens, which is formed into a positive meniscus shape which has a concave surface on an object side and a convex surface on an image side thereof and in which both the surfaces are aspherical surfaces. In the second lens 62, an intersection point between the object side surface and an optical axis is situated closer to an image side of the imaging lens than an effective aperture terminating edge of the relevant surface is through which an outermost angular light ray enters, and an intersection point between the image side surface and the optical axis is situated closer to the image side of the imaging lens than an effective aperture terminating edge of the relevant surface is through which an outermost angular light ray enters. The third lens 63 is made up of a plastic lens, which is formed into a positive meniscus shape which has a concave surface on an object side and a convex surface on an image side thereof and in which both the surfaces are aspherical surfaces. An aperture stop ST is provided between the second lens 62 and the third element 63. Lens data of the imaging lens 60 are shown in Table 16 below, aspherical coefficients of the second lens 62 and the third lens 63 are shown in Table 17 below, and design specifications of the imaging lens 60 are shown in Table 18 below. FIG. 13 shows aberration diagrams of the imaging lens 60.

TABLE 16

| Surface Numbers | R | D | n | vd |
|---|---|---|---|---|
| 1 | 16.68 | 0.90 | 1.5168 | 64.2 |
| 2 | 2.39 | 1.66 | | |
| 3 | −4.60 | 4.10 | 1.58362 | 30.2 |
| 4 | −2.95 | 0.58 | | |
| ST 5 | 0.00 | 0.03 | | |
| 6 | −52.90 | 2.25 | 1.50869 | 56 |
| 7 | −2.88 | | | |

TABLE 17

Aspherical Coefficients

| Surface Numbers | KA | B3 | B4 | B5 | B6 | B7 | B8 |
|---|---|---|---|---|---|---|---|
| 3 | −2.58E+00 | 7.01E−03 | −7.26E−03 | −8.72E−03 | 3.59E−03 | 4.77E−04 | −3.33E−04 |
| 4 | 2.74E−01 | 1.42E−02 | 8.94E−03 | −4.18E−03 | 2.93E−03 | −9.12E−04 | 2.78E−04 |
| 6 | −2.83E+01 | 1.95E−02 | −6.16E−03 | 1.91E−03 | 1.30E−03 | 1.90E−03 | 6.60E−05 |
| 7 | −2.49E+00 | −1.01E−02 | 4.95E−03 | −1.01E−02 | 3.41E−03 | −2.56E−04 | 9.33E−06 |

| Surface Numbers | B9 | B10 | B11 | B12 | B13 | B14 | B15 |
|---|---|---|---|---|---|---|---|
| 3 | 4.67E−07 | 8.20E−06 | −1.67E−07 | 4.05E−07 | 1.87E−07 | 8.51E−08 | 3.89E−08 |
| 4 | −1.14E−05 | −8.40E−06 | −2.67E−06 | 2.78E−07 | 1.07E−06 | 9.45E−07 | 5.94E−07 |
| 6 | −3.98E−04 | −5.58E−04 | −2.34E−05 | −1.80E−05 | −1.32E−05 | −8.40E−06 | −3.79E−06 |
| 7 | −7.46E−06 | 7.52E−07 | −1.31E−06 | −6.06E−07 | −2.51E−07 | −8.62E−08 | −1.80E−08 |

| Surface Numbers | B16 | B17 | B18 |
|---|---|---|---|
| 3 | −9.86E−09 | −8.08E−09 | −4.38E−10 |
| 4 | 2.53E−07 | 1.21E−08 | −1.13E−07 |
| 6 | 2.13E−07 | 2.66E−06 | 3.36E−06 |
| 7 | 6.65E−09 | 1.25E−08 | 1.17E−08 |

TABLE 18

| | |
|---|---|
| f | 2.35 |
| f1 | −5.51 |
| f2 | 7.30 |
| f3 | 5.86 |
| f12 | 11.43 |
| f23 | 3.19 |
| 2ω | 126 |
| L | 14.27 |
| BF | 4.73 |
| Fno | 2.40 |

In the imaging lens 60, |L/f1|=2.59, and the conditional expression (1), 0.5<|L/f1|<7, is satisfied. In addition, |f2/f3|=1.25, and the conditional expression (2), 0.2<|f2/f3|<10, is satisfied. Furthermore, |f1/f23|=1.73, and the conditional expression (3), $0.2<|f1/f23|<6$, is satisfied. $L/f=6.08$, and the conditional expression (4), $0<L/f<15$, is satisfied.

Embodiment 7

Figure 14:
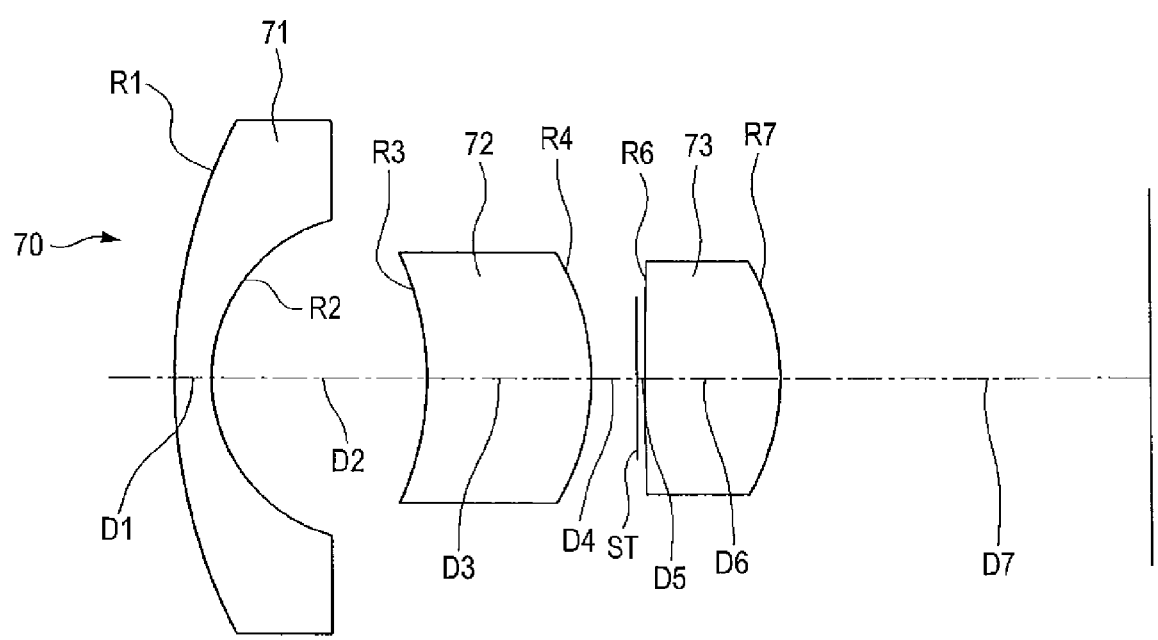
FIG. 14 is an a sectional view showing a lens configuration of a seventh embodiment.
Figure 15:
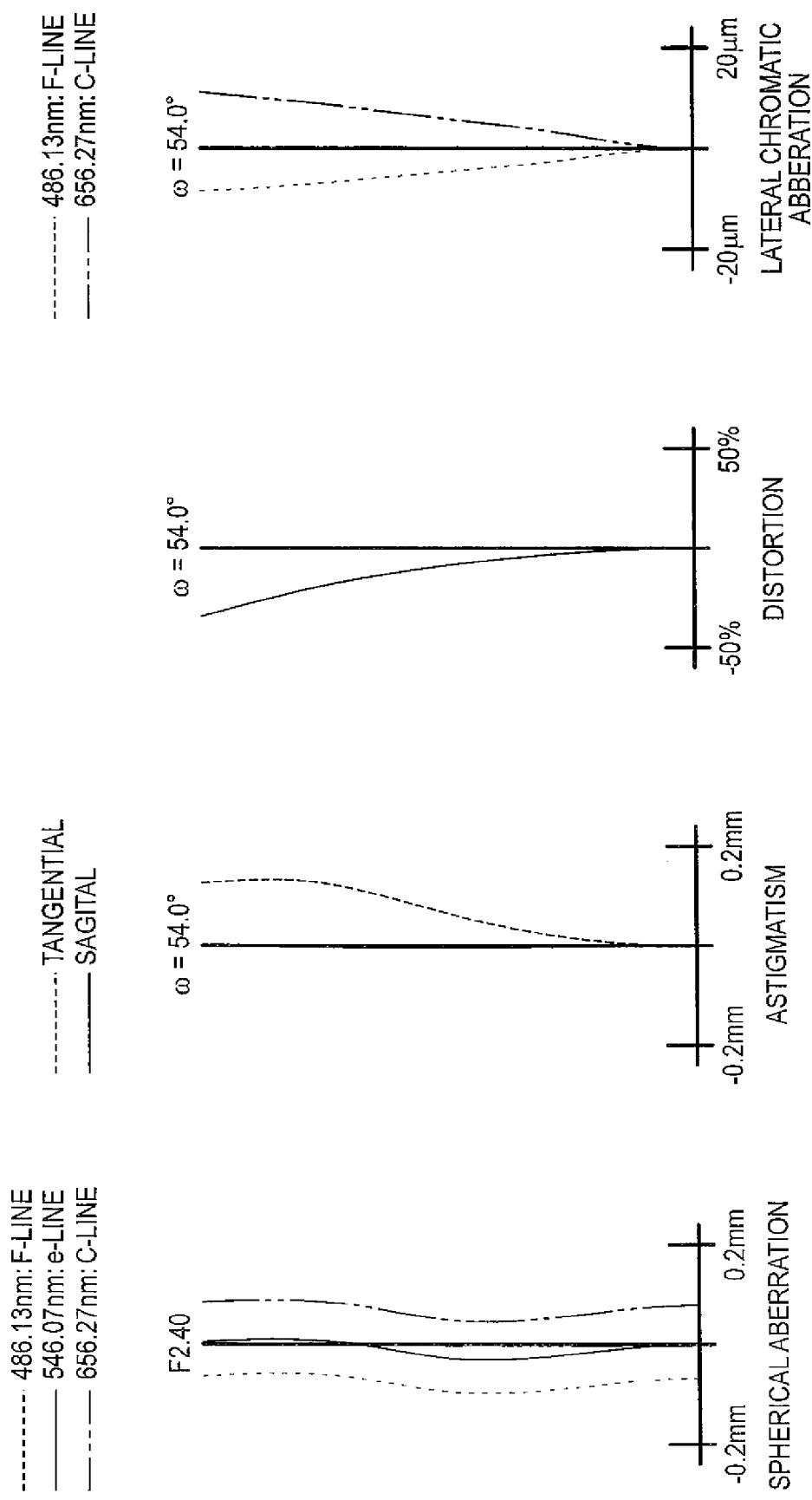
FIG. 15 is an aberration diagrams of the seventh embodiment.

In FIG. 14, an imaging lens 70 includes, in order from an object side, a first lens 71, a second lens 72 and a third lens 73. The first lens 71 is made up of a glass spherical lens, which is formed into a negative meniscus shape which has a convex surface on an object side and a concave surface on an image side thereof. The second lens 72 is made up of a plastic lens, which is formed into a positive meniscus shape which has a concave surface on an object side and a convex surface on an image side thereof and in which both the surfaces are aspherical surfaces. In the second lens 72, an intersection point between the object side surface and an optical axis is situated closer to an image side of the imaging lens than an effective aperture terminating edge of the relevant surface is through which an outermost angular light ray enters, and an intersection point between the image side surface and the optical axis is situated closer to the image side of the imaging lens than an effective aperture terminating edge of the relevant surface is through which an outermost angular light ray enters. The third lens 73 is made up of a plastic lens, which is formed into a positive meniscus shape which has a concave surface on an object side and a convex surface on an image side thereof and in which both the surfaces are aspherical surfaces. An aperture stop ST is provided between the second lens 72 and the third element 73. Lens data of the imaging lens 70 are shown in Table 19 below, aspherical coefficients of the second lens 72 and the third lens 73 are shown in Table 20 below, and design specifications of the imaging lens 70 are shown in Table 21 below. FIG. 15 shows aberration diagrams of the imaging lens 70.

TABLE 19

| Surface Numbers | R | D | n | νd |
|---|---|---|---|---|
| 1 | 6.77 | 0.46 | 1.5168 | 64.2 |
| 2 | 2.01 | 2.63 | | |
| 3 | −4.52 | 2.00 | 1.58362 | 30.2 |
| 4 | −2.53 | 0.57 | | |
| ST 5 | 0.00 | 0.11 | | |
| 6 | −233.44 | 1.64 | 1.50869 | 56 |
| 7 | −2.74 | | | |

TABLE 20

| Aspherical Coefficients | | | | | | | |
|---|---|---|---|---|---|---|---|
| Surface Numbers | KA | B3 | B4 | B5 | B6 | B7 | B8 |
| 3 | −2.57E+00 | −9.39E−03 | −7.70E−03 | −8.53E−03 | 3.62E−03 | 4.81E−04 | −3.32E−04 |
| 4 | 3.71E−01 | 7.69E−03 | 7.61E−03 | −4.43E−03 | 2.90E−03 | −9.14E−04 | 2.78E−04 |
| 6 | −2.83E+01 | 1.67E−02 | −7.50E−03 | 1.85E−03 | 1.30E−03 | 1.90E−03 | 6.61E−05 |
| 7 | −2.50E+00 | −1.34E−02 | 4.59E−03 | −1.01E−02 | 3.41E−03 | −2.55E−04 | 9.44E−06 |

| Surface Numbers | B9 | B10 | B11 | B12 | B13 | B14 | B15 |
|---|---|---|---|---|---|---|---|
| 3 | 4.96E−07 | 8.20E−06 | −1.67E−07 | 4.05E−07 | 1.87E−07 | 8.51E−08 | 3.89E−08 |
| 4 | −1.14E−05 | −8.40E−06 | −2.67E−06 | 2.78E−07 | 1.07E−06 | 9.45E−07 | 5.94E−07 |
| 6 | −3.98E−04 | −5.58E−04 | −2.34E−05 | −1.80E−05 | −1.32E−05 | −8.40E−06 | −3.79E−06 |
| 7 | −7.44E−06 | 7.54E−07 | −1.31E−06 | −6.06E−07 | −2.51E−07 | −8.62E−08 | −1.80E−08 |

| Surface Numbers | B16 | B17 | B18 |
|---|---|---|---|
| 3 | −9.86E−09 | −8.08E−09 | −4.38E−10 |
| 4 | 2.53E−07 | 1.21E−08 | −1.13E−07 |
| 6 | 2.13E−07 | 2.66E−06 | 3.36E−06 |
| 7 | 6.65E−09 | 1.25E−08 | 1.17E−08 |

TABLE 21

| f | 2.48 |
|---|---|
| f1 | −5.71 |
| f2 | 7.12 |
| f3 | 5.41 |
| f12 | 12.79 |
| f23 | 3.23 |
| 2ω | 108 |
| L | 11.77 |
| BF | 4.36 |
| Fno | 2.40 |

In the imaging lens 70, $|L/f1|=2.06$, and the conditional expression (1), $0.5<|L/f1|<7$, is satisfied. In addition, $|f2/f3|=1.32$, and the conditional expression (2), $0.2<|f2/f3|<10$, is satisfied. Furthermore, $|f1/f23|=1.77$, and the conditional expression (3), $0.2<|f1/f23|<6$, is satisfied. $L/f=4.74$, and the conditional expression (4), $0<L/f<15$, is satisfied.

Embodiment 8

Figure 16:
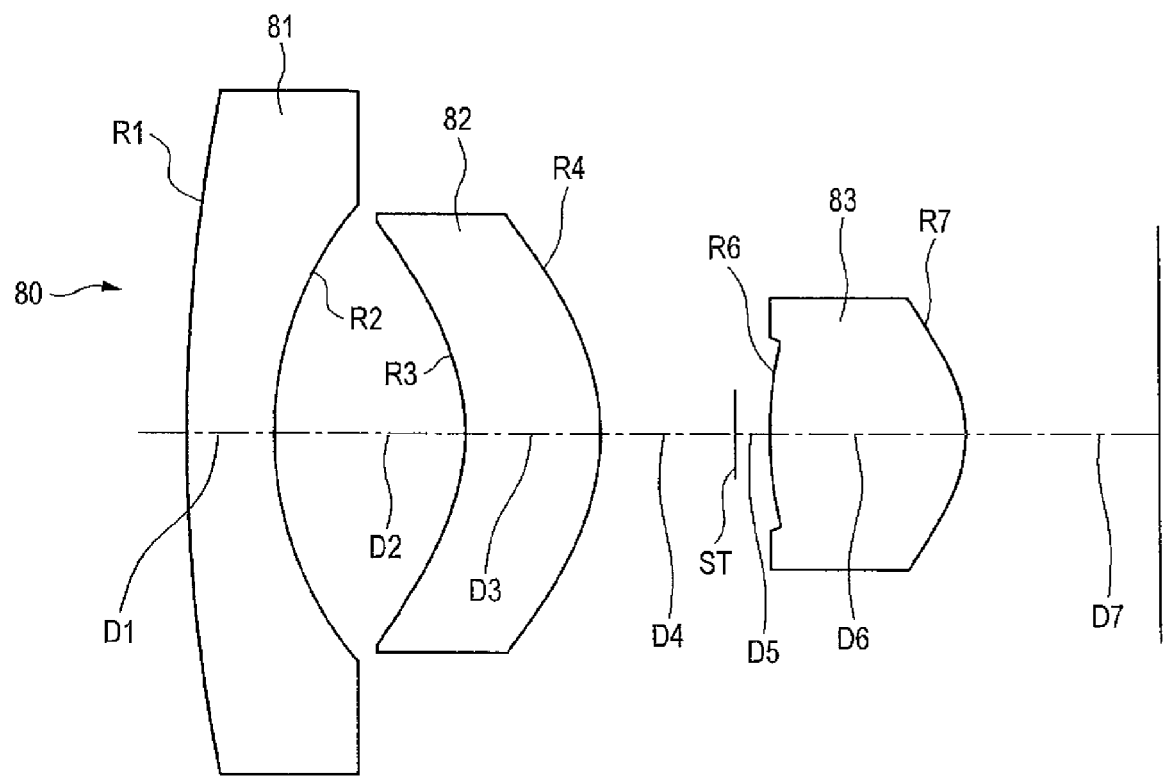
FIG. 16 is a sectional view showing a lens configuration of an eighth embodiment.
Figure 17:
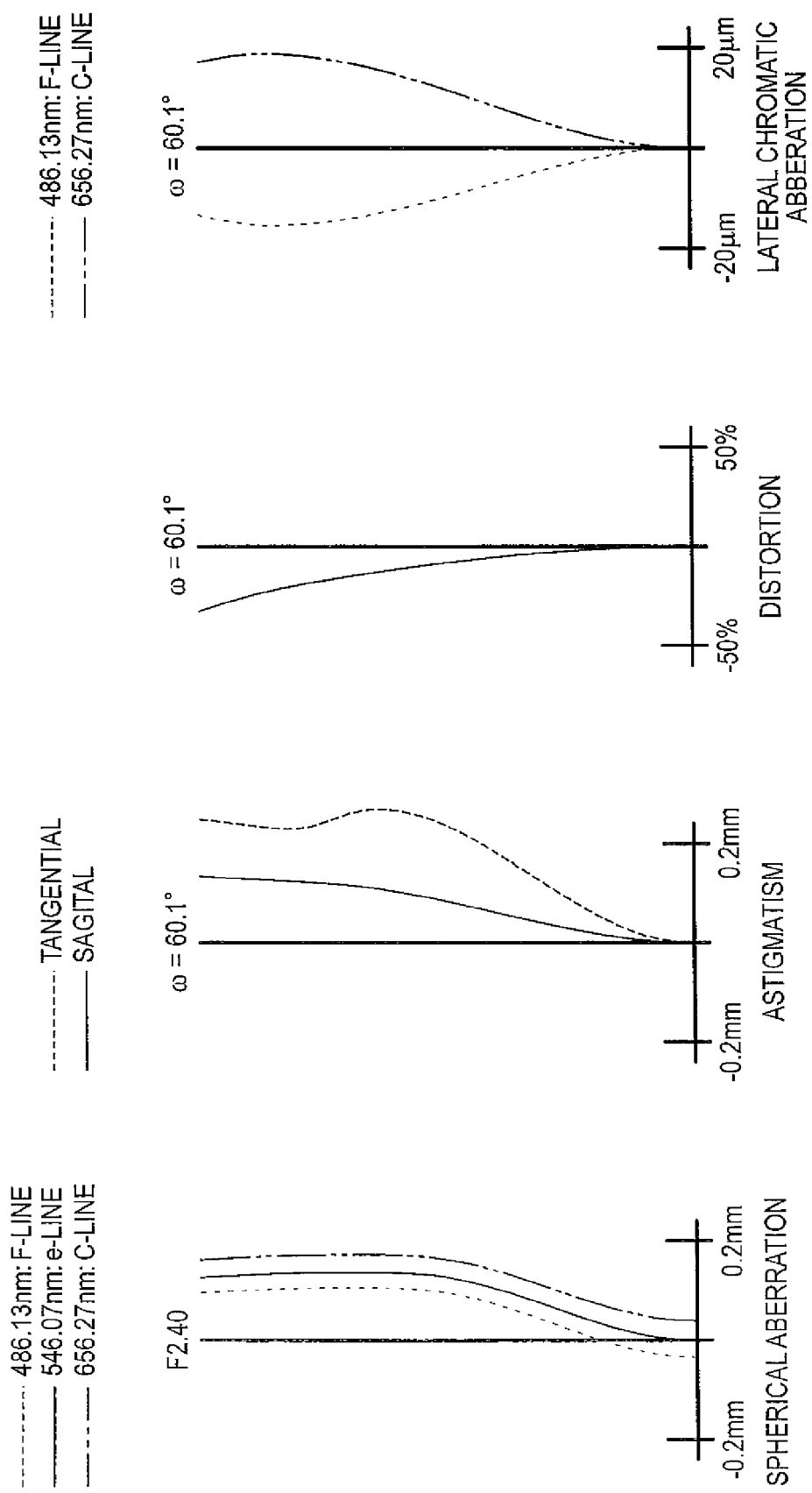
FIG. 17 is an aberration diagrams of the eighth embodiment.

In FIG. 16, an imaging lens 80 includes, in order from an object side, a first lens 81, a second lens 82 and a third lens 83. The first lens 81 is made up of a glass spherical lens, which is formed into a negative meniscus shape which has a convex surface on an object side and a concave surface on an image side thereof. The second lens 82 is made up of a plastic lens, which is formed into a positive meniscus shape which has a concave surface on an object side and a convex surface on an image side thereof and in which both the surfaces are aspherical surfaces. In the second lens 82, an intersection point between the object side surface and an optical axis is situated closer to an image side of the imaging lens than an effective aperture terminating edge of the relevant surface is through which an outermost angular light ray enters, and an intersection point between the image side surface and the optical axis is situated closer to the image side of the imaging lens than an effective aperture terminating edge of the relevant surface is through which an outermost angular light ray enters. The third lens 83 is made up of a plastic lens, which is formed into a double-convex shape which has a convex surface on an object side and a convex surface on an image side thereof and in which both the surfaces are aspherical surfaces. An aperture stop ST is provided between the second lens 82 and the third element 83. Lens data of the imaging lens 80 are shown in Table 22 below, aspherical coefficients of the second lens 82 and the third lens 83 are shown in Table 23 below, and design specifications of the imaging lens 80 are shown in Table 24 below. FIG. 17 shows aberration diagrams of the imaging lens 80.

TABLE 22

| Surface Numbers | R | D | n | vd |
|---|---|---|---|---|
| 1 | 30.00 | 1.37 | 1.58313 | 59.4 |
| 2 | 5.48 | 3.09 | | |
| 3 | −2.46 | 2.14 | 1.58362 | 30.2 |
| 4 | −2.58 | 2.12 | | |
| ST 5 | 0.00 | 0.57 | | |
| 6 | 5.98 | 3.11 | 1.50869 | 56 |
| 7 | −2.04 | | | |

TABLE 23

Aspherical Coefficients

| Surface Numbers | KA | B3 | B4 | B5 | B6 |
|---|---|---|---|---|---|
| 3 | −3.10E+00 | 1.16E−02 | −9.15E−04 | −1.85E−03 | 2.29E−04 |
| 4 | 3.61E−01 | 3.98E−02 | 3.36E−03 | −4.26E−03 | 8.21E−04 |
| 6 | 1.56E+01 | −1.63E−02 | 6.05E−03 | 3.47E−03 | −1.02E−02 |
| 7 | −2.30E+00 | −4.90E−02 | 2.08E−02 | −3.03E−03 | 7.35E−04 |

TABLE 24

| | |
|---|---|
| f | 1.96 |
| f1 | −11.70 |
| f2 | 16.17 |
| f3 | 3.43 |
| f12 | 55.89 |
| f23 | 2.72 |
| 2ω | 120 |
| L | 15.23 |
| BF | 2.83 |
| Fno | 2.40 |

In the imaging lens 80, $|L/f1|=1.30$, and the conditional expression (1), $0.5<|L/f1|<7$, is satisfied. In addition, $|f2/f3|=4.72$, and the conditional expression (2), $0.2<|f2/f3|<10$, is satisfied. Furthermore, $|f1/f23|=4.29$, and the conditional expression (3), $0.2<|f1/f23|<6$, is satisfied. $L/f=7.76$, and the conditional expression (4), $0<L/f<15$, is satisfied.

Embodiment 9

Figure 18:
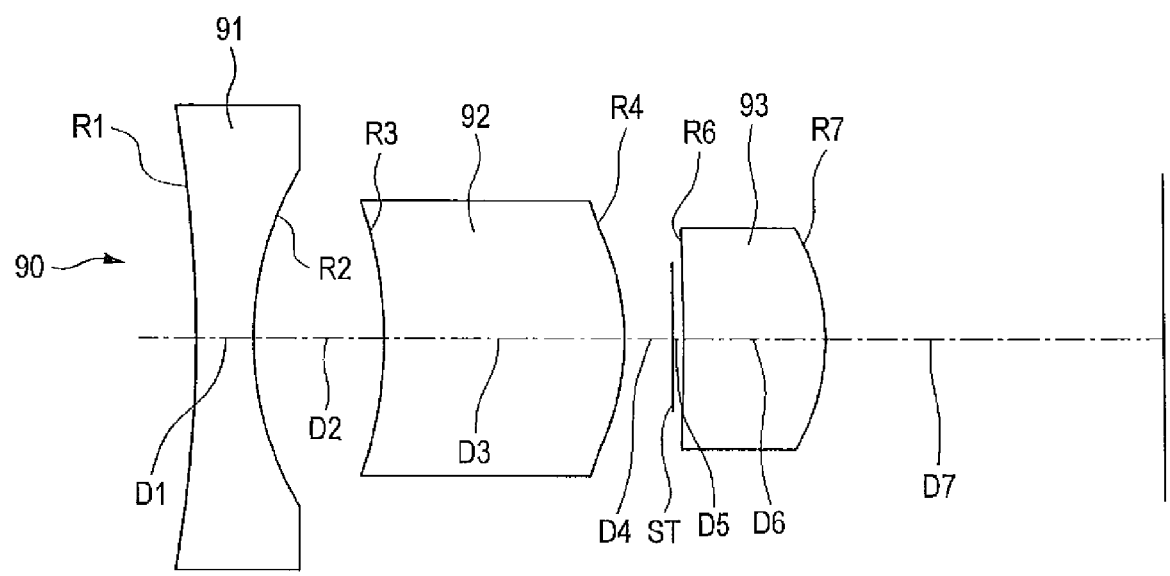
FIG. 18 is a sectional view showing a lens configuration of a ninth embodiment.
Figure 19:
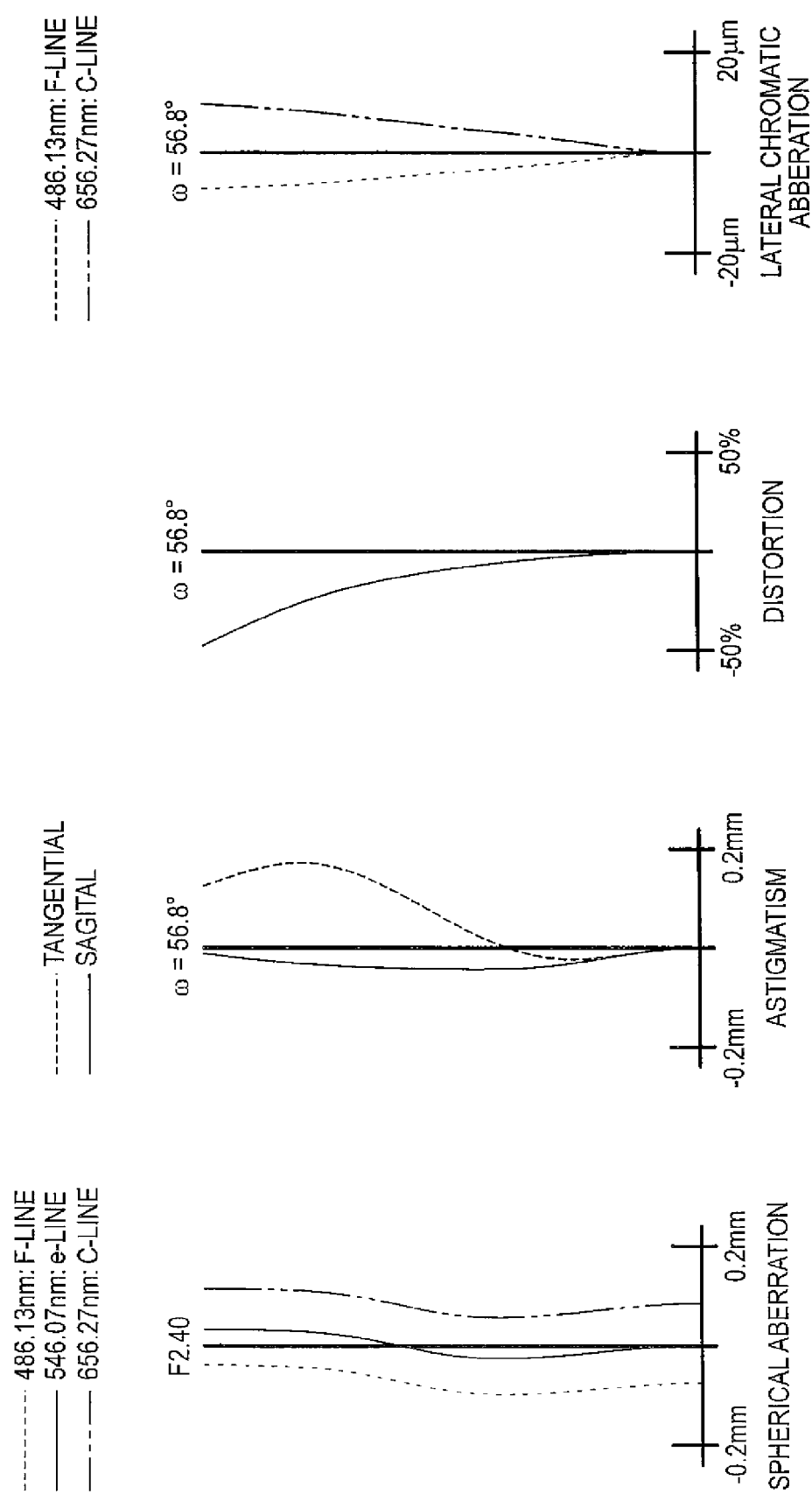
FIG. 19 is an aberration diagrams of the ninth embodiment.

In FIG. 18, an imaging lens 90 includes, in order from an object side, a first lens 91, a second lens 92 and a third lens 93. The first lens 91 is made up of a glass spherical lens, which is formed into a double-concave shape which has a concave surface on an object side and a concave surface on an image side thereof and in which an absolute value of radius of curvature of the concave surface on the image side is smaller than an absolute value of radius of curvature of the concave surface on the object side. The second lens 92 is made up of a plastic lens, which is formed into a positive meniscus shape which has a concave surface on an object side and a convex surface on an image side thereof and in which both the surfaces are aspherical surfaces. In the second lens 92, an intersection point between the object side surface and an optical axis is situated closer to an image side of the imaging lens than an effective aperture terminating edge of the relevant surface is through which an outermost angular light ray enters, and an intersection point between the image side surface and the optical axis is situated closer to the image side of the imaging lens than an effective aperture terminating edge of the relevant surface is through which an outermost angular light ray enters. The third lens 93 is made up of a plastic lens, which is formed into a positive meniscus shape which has a concave surface on an object side and a convex surface on an image side thereof and in which both the surfaces are aspherical surfaces. An aperture stop ST is provided between the second lens 92 and the third element 93. Lens data of the imaging lens 90 are shown in Table 25 below, aspherical coefficients of the second lens 92 and the third lens 93 are shown in Table 26 below, and design specifications of the imaging lens 90 are shown in Table 27 below. FIG. 19 shows aberration diagrams of the imaging lens 90.

TABLE 25

| Surface Numbers | R | D | n | vd |
|---|---|---|---|---|
| 1 | −18.00 | 0.80 | 1.5168 | 64.2 |
| 2 | 4.55 | 1.81 | | |
| 3 | −7.05 | 3.31 | 1.58362 | 30.2 |
| 4 | −2.72 | 0.64 | | |
| ST 5 | 0.00 | 0.17 | | |
| 6 | −11.21 | 1.96 | 1.50869 | 56 |
| 7 | −2.76 | | | |

TABLE 26

| Surface Numbers | KA | B3 | B4 | B5 | B6 | B7 | B8 |
|---|---|---|---|---|---|---|---|
| 3 | −2.57E+00 | 1.95E−03 | −5.24E−03 | −7.76E−03 | 3.72E−03 | 4.88E−04 | −3.33E−04 |
| 4 | 2.26E−01 | 1.09E−02 | 1.07E−02 | −4.34E−03 | 2.88E−03 | −9.18E−04 | 2.77E−04 |
| 5 | −2.83E+01 | 1.96E−02 | −6.27E−03 | 2.10E−03 | 1.33E−03 | 1.90E−03 | 6.62E−05 |
| 6 | −2.59E+00 | −9.87E−03 | 4.98E−03 | −1.03E−02 | 3.37E−03 | −2.60E−04 | 8.98E−06 |

TABLE 26-continued

| Surface Numbers | B9 | B10 | B11 | B12 | B13 | B14 | B15 |
|---|---|---|---|---|---|---|---|
| 3 | 3.54E−07 | 8.18E−06 | −1.71E−07 | 4.04E−07 | 1.87E−07 | 8.51E−08 | 3.89E−08 |
| 4 | −1.14E−05 | −8.41E−06 | −2.67E−06 | 2.78E−07 | 1.07E−06 | 9.45E−07 | 5.94E−07 |
| 5 | −3.98E−04 | −5.58E−04 | −2.34E−05 | −1.80E−05 | −1.32E−05 | −8.40E−06 | −3.79E−06 |
| 6 | −7.49E−06 | 7.50E−07 | −1.31E−06 | −6.06E−07 | −2.51E−07 | −8.62E−08 | −1.80E−08 |

| Surface Numbers | B16 | B17 | B18 |
|---|---|---|---|
| 3 | −9.86E−09 | −8.08E−09 | −4.38E−10 |
| 4 | 2.53E−07 | 1.21E−08 | −1.13E−07 |
| 5 | 2.13E−07 | 2.66E−06 | 3.36E−06 |
| 6 | 6.65E−09 | 1.25E−08 | 1.17E−08 |

TABLE 27

| | |
|---|---|
| f | 2.79 |
| f1 | −6.92 |
| f2 | 5.87 |
| f3 | 6.65 |
| f12 | 7.24 |
| f23 | 3.51 |
| 2ω | 114 |
| L | 13.17 |
| BF | 4.48 |
| Fno | 2.40 |

In the imaging lens 90, |L/f1|=1.90, and the conditional expression (1), 0.5<|L/f1|<7, is satisfied. In addition, |f2/f3|=0.88, and the conditional expression (2), 0.2<|f2/f3|<10, is satisfied. Furthermore, |f1/f23|=1.97, and the conditional expression (3), 0.2<|f1/f23|<6, is satisfied. L/f=4.72, and the conditional expression (4), 0<L/f<15, is satisfied.

Embodiment 10

Figure 20:
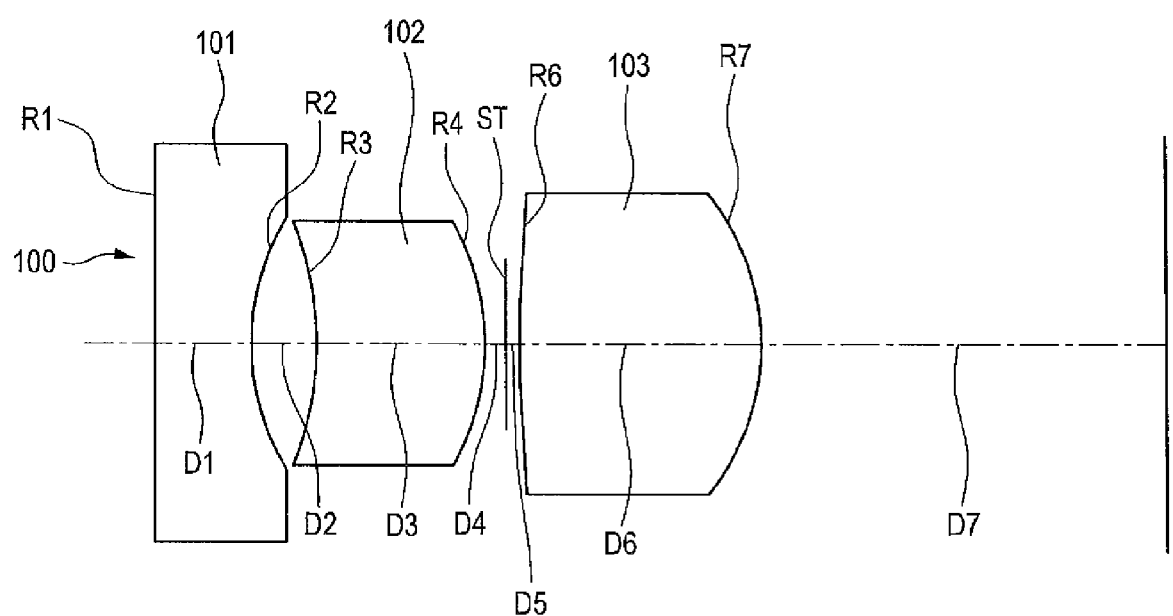
FIG. 20 is a sectional view showing a lens configuration of a tenth embodiment.
Figure 21:
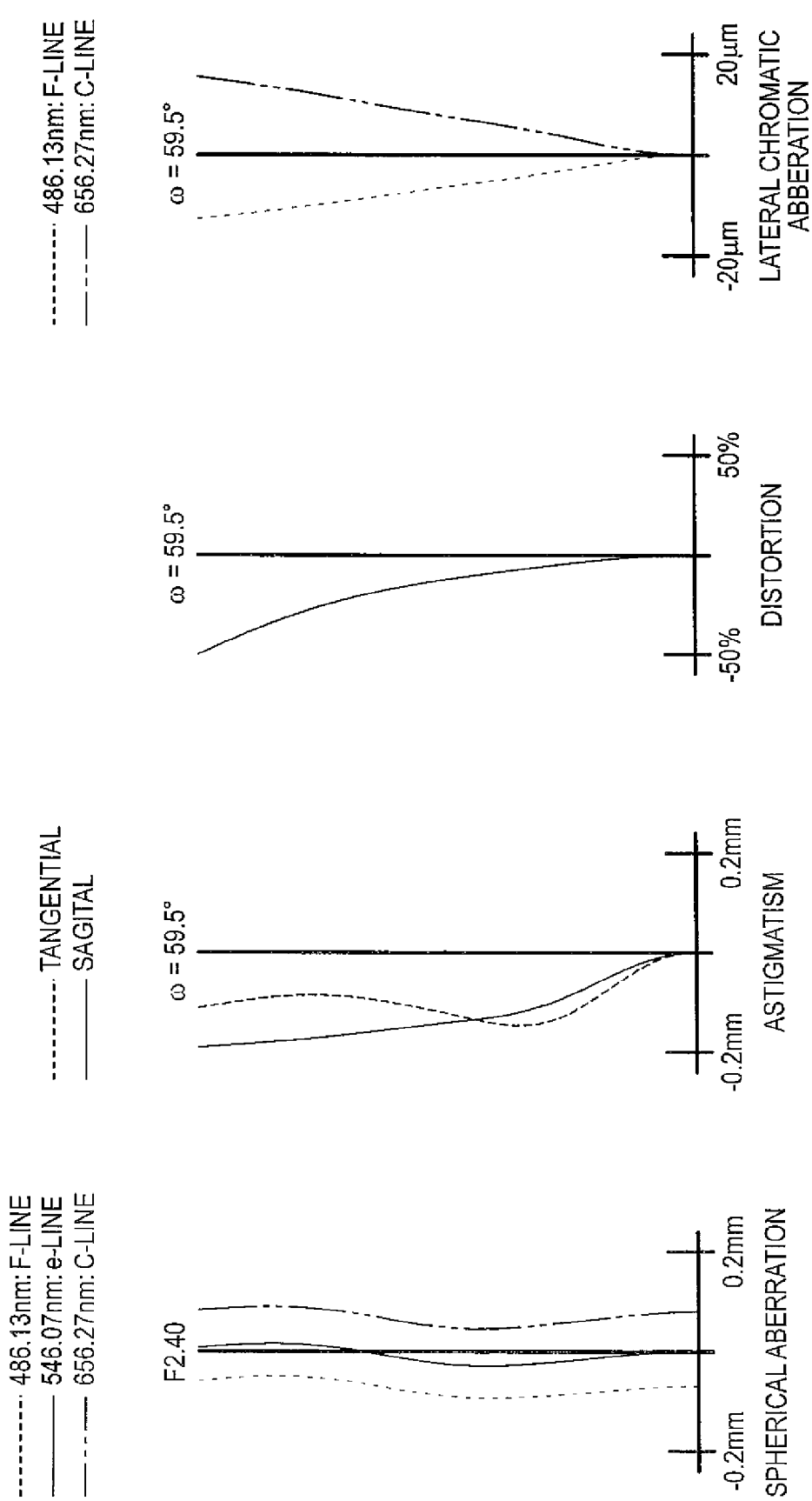
FIG. 21 is an aberration diagrams of the tenth embodiment.

In FIG. 20, an imaging lens 100 includes, in order from an object side, a first lens 101, a second lens 102 and a third lens 103. The first lens 101 is made up of a glass spherical lens, which is formed into a planoconcave shape which has a plane on an object side and a concave surface on an image side thereof. The second lens 102 is made up of a plastic lens, which is formed into a positive meniscus shape which has a concave surface on an object side and a convex surface on an image side thereof and in which both the surfaces are aspherical surfaces. In the second lens 102, an intersection point between the object side surface and an optical axis is situated closer to an image side of the imaging lens than an effective aperture terminating edge of the relevant surface is through which an outermost angular light ray enters, and an intersection point between the image side surface and the optical axis is situated closer to the image side of the imaging lens than an effective aperture terminating edge of the relevant surface is through which an outermost angular light ray enters. The third lens 103 is made up of a plastic lens, which is formed into a double-convex shape which has a convex surface on an object side and a convex surface on an image side thereof and in which both the surfaces are aspherical surfaces. An aperture stop ST is provided between the second lens 102 and the third element 103. Lens data of the imaging lens 100 are shown in Table 28 below, aspherical coefficients of the second lens 102 and the third lens 103 are shown in Table 29 below, and design specifications of the imaging lens 100 are shown in Table 30 below. FIG. 21 shows aberration diagrams of the imaging lens 100.

TABLE 28

| Surface Numbers | R | D | n | vd |
|---|---|---|---|---|
| 1 | 0.00 | 1.05 | 1.7725 | 49.6 |
| 2 | 2.70 | 0.70 | | |
| 3 | −5.29 | 1.83 | 1.58362 | 30.2 |
| 4 | −2.14 | 0.23 | | |
| ST 5 | 0.00 | 0.16 | | |
| 6 | 213.60 | 2.58 | 1.50869 | 56 |
| 7 | −2.44 | | | |

TABLE 29

Aspherical Coefficients

| Surface Numbers | KA | B3 | B4 | B5 | B6 | B7 | B8 |
|---|---|---|---|---|---|---|---|
| 3 | −2.43E+00 | −2.89E−02 | −9.13E−03 | −7.31E−03 | 3.94E−03 | 5.29E−04 | −3.27E−04 |
| 4 | 5.00E−01 | 2.34E−02 | 8.53E−03 | −4.48E−03 | 2.86E−03 | −9.24E−04 | 2.76E−04 |
| 5 | −2.83E+01 | 2.59E−02 | −7.63E−03 | 1.94E−03 | 1.34E−03 | 1.90E−03 | 6.67E−05 |
| 6 | −2.15E+00 | −3.37E−02 | 9.48E−03 | −9.11E−03 | 3.45E−03 | −2.65E−04 | 6.90E−06 |

| Surface Numbers | B9 | B10 | B11 | B12 | B13 | B14 | B15 |
|---|---|---|---|---|---|---|---|
| 3 | 1.09E−06 | 8.26E−06 | −1.61E−07 | 4.05E−07 | 1.87E−07 | 8.51E−08 | 3.89E−08 |
| 4 | −1.16E−05 | −8.42E−06 | −2.67E−06 | 2.77E−07 | 1.07E−06 | 9.45E−07 | 5.94E−07 |
| 5 | −3.98E−04 | −5.58E−04 | −2.34E+00 | −1.80E−05 | −1.32E−05 | −8.40E−06 | −3.79E−06 |
| 6 | −7.84E−06 | 7.03E−07 | −1.32E−06 | −6.06E−07 | −2.51E−07 | −8.62E−08 | −1.80E−08 |

TABLE 29-continued

| | Aspherical Coefficients | | |
|---|---|---|---|
| Surface Numbers | B16 | B17 | B18 |
| 3 | −9.86E−09 | −8.08E−09 | −4.38E−10 |
| 4 | 2.53E−07 | 1.21E−08 | −1.13E−07 |
| 5 | 2.13E−07 | 2.66E−06 | 3.36E−06 |
| 6 | 6.65E−09 | 1.25E−08 | 1.17E−08 |

TABLE 30

| | |
|---|---|
| f | 2.64 |
| f1 | −3.48 |
| f2 | 5.04 |
| f3 | 4.74 |
| f12 | 24.08 |
| f23 | 2.87 |
| 2ω | 119 |
| L | 10.74 |
| BF | 4.19 |
| Fno | 2.40 |

In the imaging lens 100, |L/f1|=3.09, and the conditional expression (1), 0.5<|L/f1|<7, is satisfied. In addition, |f2/f3|=1.06, and the conditional expression (2), 0.2<|f2/f3|<10, is satisfied. Furthermore, |f1/f23|=1.21, and the conditional expression (3), 0.2<|f1/f23|<6, is satisfied. L/f=4.07, and the conditional expression (4), 0<L/f<15, is satisfied.

While in the embodiments, the first lens is made up of the spherical lens which is made of glass and the second lens and the third lens are each made up of the plastic lens and are each aspherical on both the sides thereof, the first lens may be made up of an aspherical lens. Although a center curvature on the image side surface of the second lens is desirably convex, the image side surface of the second lens may be formed into a shape in which a concave surface changes into a convex surface as it extends towards the periphery thereof.

Since the onboard camera is used under the sever environments where it is exposed to wind, rain and direct sun light, the onboard camera is required to have superior water resistance and weathering resistance such as acids resistance, as well as strong resistances to fats and oils and chemicals such as detergents. In the onboard camera, materials which have superior water resistance and acids resistance are good to be used for, in particular, the first lens which lies nearest to objects. Specifically, on water resistance [RW(p)] and acid resistance [RA(p)] standards provided by GLASS MANUFACTURERS' ASSOCIATION OF JAPAN, a material is desirable which has a resistance to water classified as first to third grades and a resistance to acids classified as first to fourth grades both based on the powder method. A material is more preferable which has a resistance to water and a resistance to acids both classified as the second grade or higher based on the powder method.

According to the invention, the high-performance imaging lens can be obtained which is bright with an f number of 2.4 and which can correct properly the field curvature and obtain a wide angle of view in which the diagonal angle of view is 80 degrees or more. In addition, the imaging lens can be realized which is superior in weathering resistance and hence is more suitable for use on an onboard camera, a monitor camera and the like which are used under severe environments.

The entire disclosure of each and every foreign patent application from which the benefit of foreign priority has been claimed in the present application is incorporated herein by reference, as if fully set forth.

What is claimed is:

1. An imaging lens comprising, in order from an object side:
    a first lens having a negative refractive power with a concave surface on an image side thereof;
    a second lens with at least one aspherical surface;
    an aperture stop; and
    a third lens having a positive refractive power with at least one aspherical surface,
    wherein the first lens is formed of an optical glass whose Abbe number is 40 or more, the second lens is formed of a plastic whose Abbe number is 40 or less, and the third lens is formed of a plastic whose Abbe number is 50 or more,
    wherein assuming that a point, where a light ray which constitutes an outermost light ray in light rays which enter an image plane intersects a lens surface, constitutes an effective aperture terminating edge, the second lens is such that an intersection point between an object side surface and an optical axis lies closer to an image forming side of the imaging lens than an effective aperture terminating edge of the object side surface does,
    wherein, letting focal lengths of the second lens and the third lens be f2, f3, respectively, the following conditional expression is satisfied:

$$0.2 < f2/f3 \leq 3.54 \quad (2'), \text{ and}$$

wherein letting a distance from an apex on an object side surface of the first lens to the image plane be L and a focal length of the first lens be f1, the following conditional expression is satisfied:

$$0.5 < |L/f1| \leq 2.62 \quad (1'').$$

2. An imaging lens as set forth in claim 1,
    wherein the second lens is such that an intersection point between an image side surface and the optical axis lies closer to the image forming side of the imaging lens than an effective aperture terminating edge of the image side surface does.

3. An imaging lens as set forth in claim 2,
    wherein the second lens is a meniscus lens having a concave surface on an object side thereof.

4. An imaging lens as set forth in claim 1,
    wherein the second lens is a meniscus lens having a concave surface on an object side thereof.

5. An imaging lens as set forth in claim 1,
    wherein letting a focal length of the first lens be f1 and a composite focal length of the second lens and the third lens be f23, the following conditional expression is satisfied:

$$0.2 < |f1/f23| < 6 \quad (3).$$

6. An imaging lens as set forth in claim 1,
wherein letting a focal length of the imaging lens be f, the following expression is satisfied:

$$0 < L/f < 15 \quad (4).$$

7. A camera system comprising:
an imaging lens as set forth in claim 1; and
a solid state image sensing device that converts an optical image formed by the imaging lens into an electric signal.

8. An imaging lens as set forth in claim 1, wherein letting focal lengths of the second lens and the third lens be f2, f3, respectively, the following conditional expression is satisfied:

$$0.5 < |f2/f3| < 5.$$

9. An imaging lens as set forth in claim 1, wherein letting a focal length of the imaging lens be f, and a distance from an apex on an object side surface of the first lens to the image plane be L, the following expression is satisfied:

$$4 < L/f < 8.$$

10. An imaging lens as set forth in claim 1, wherein the first lens is a glass spherical lens.

11. An imaging lens as set forth in claim 1, wherein a light cut-off film or an opaque plate material is provided in connection with the first lens, to prevent the entrance of light from the outside of an effective aperture.

12. An imaging lens as set forth in claim 1, wherein the object side surface and the image side surface of the second and third lenses are aspherical surfaces.

13. An imaging lens as set forth in claim 1, wherein the third lens has a positive meniscus shape which has a concave surface on an object side.

14. An imaging lens as set forth in claim 1, wherein the third lens is formed into a double-convex shape which has a convex surface on an object side and a convex surface on an image side thereof and in which both the object side convex surface and the image side convex surface are aspherical surfaces.

15. An imaging lens as set forth in claim 1, wherein the first lens is formed into a double-concave shape which has a concave surface on an object side and a concave surface on an image side thereof and in which an absolute value of radius of curvature of the concave surface on the image side is smaller than an absolute value of radius of curvature of the concave surface on the object side.

16. An imaging lens as set forth in claim 1, wherein the first lens is formed into a planoconcave shape which has a plane on an object side and a concave surface on an image side thereof.

17. An imaging lens as set forth in claim 1, wherein the first lens is made of a material which has superior water resistance and acids resistance.

18. An imaging lens as set forth in claim 1, wherein said imaging lens has a wide angle of view in which the diagonal angle of view is 80 degrees or more.

* * * * *